United States Patent
Hirabayashi et al.

(10) Patent No.: US 9,606,357 B2
(45) Date of Patent: Mar. 28, 2017

(54) IMAGE DISPLAY DEVICE, IMAGE DISPLAY METHOD, STORAGE MEDIUM, AND IMAGE DISPLAY SYSTEM

(71) Applicant: SONY CORPORATION, Tokyo (JP)

(72) Inventors: Takayuki Hirabayashi, Tokyo (JP); Yoichiro Sako, Tokyo (JP); Kouichirou Ono, Tokyo (JP); Masakazu Yajima, Chiba (JP); Masashi Takeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/201,466

(22) Filed: Mar. 7, 2014

(65) Prior Publication Data

US 2014/0278100 A1 Sep. 18, 2014

(30) Foreign Application Priority Data

Mar. 15, 2013 (JP) .................. 2013-053739

(51) Int. Cl.
*G02B 27/01* (2006.01)

(52) U.S. Cl.
CPC ........ *G02B 27/017* (2013.01); *G02B 27/0176* (2013.01); *G02B 2027/014* (2013.01); *G02B 2027/0187* (2013.01)

(58) Field of Classification Search
CPC .............. G02B 27/017; G02B 27/0176; G02B 2027/014; G02B 2027/0187
USPC ............................................. 701/415; 345/8
See application file for complete search history.

(56) References Cited

U.S. PATENT DOCUMENTS

| | | | | |
|---|---|---|---|---|
| 8,280,626 B2* | 10/2012 | Klooster | ............. | G08G 5/0013 701/3 |
| 2011/0270518 A1* | 11/2011 | Nguyen | ............. | G01C 21/3469 701/533 |
| 2013/0080053 A1* | 3/2013 | Rakshit | ............. | G01C 21/3469 701/527 |
| 2013/0211705 A1* | 8/2013 | Geelen | .................. | G01C 21/34 701/410 |
| 2014/0098008 A1* | 4/2014 | Hatton | ................... | G06T 11/00 345/8 |

FOREIGN PATENT DOCUMENTS

| | | | |
|---|---|---|---|
| JP | 2002-287846 A | 10/2002 | |
| JP | 2006-017708 A | 1/2006 | |

(Continued)

OTHER PUBLICATIONS https://web.archive.org/web/20120817023509/http://www.diginfo.tv/v/10-0121-r-en.php, Aug. 17, 2012.*

(Continued)

*Primary Examiner* — Aaron L Troost
(74) *Attorney, Agent, or Firm* — Chip Law Group

(57) ABSTRACT

A head- or face-mounted image display device includes an environmental information acquisition unit that acquires environmental information, a state information acquisition unit that acquires state information, a guidance information generation unit that generates guidance information for guidance into a state in which the influence of environment is reduced or increased based on at least one piece of environmental information acquired for each state, and a provision unit that provides the guidance information.

21 Claims, 28 Drawing Sheets

(56) References Cited

FOREIGN PATENT DOCUMENTS

| | | |
|---|---|---|
| JP | 2006-275720 A | 10/2006 |
| JP | 2007-034495 A | 2/2007 |
| JP | 2009-145059 A | 7/2009 |
| JP | 2009-264902 A | 11/2009 |
| JP | 2011-002753 A | 1/2011 |
| JP | 2011-187030 A | 9/2011 |
| JP | 2011-203137 A | 10/2011 |
| JP | 2012-168683 A | 9/2012 |

OTHER PUBLICATIONS https:web.archive.org/web/20120817023509/http://www.diginfo.tv/v/10-0121-r-3n.php, Aug. 17, 2012.*

* cited by examiner

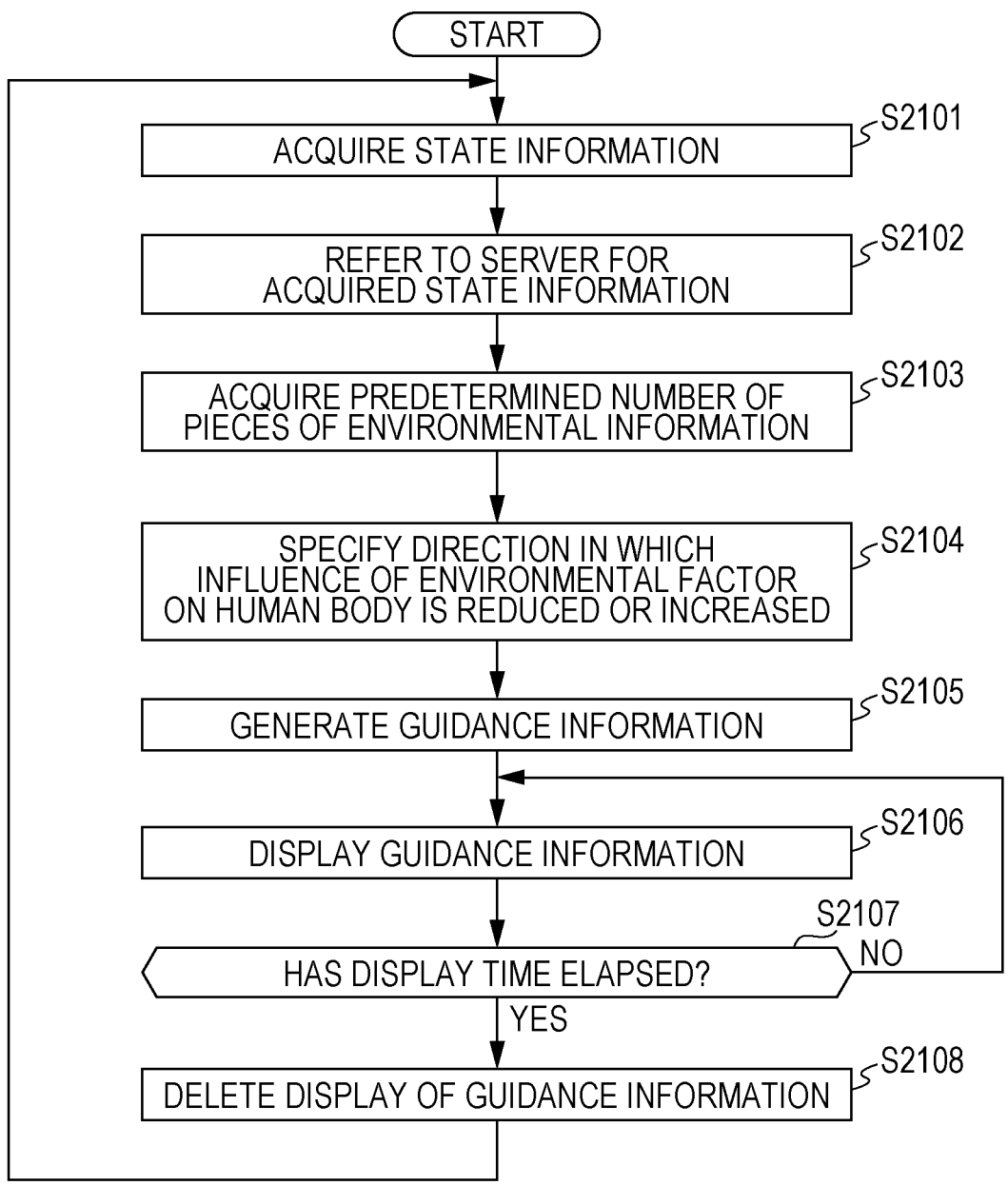

IMAGE DISPLAY DEVICE, IMAGE DISPLAY METHOD, STORAGE MEDIUM, AND IMAGE DISPLAY SYSTEM

CROSS-REFERENCE TO RELATED APPLICATION(S)

This application claims the benefit of Japanese Priority Patent Application JP 2013-053739 filed Mar. 15, 2013, the entire contents of which are incorporated herein by reference.

BACKGROUND

The present technology relates to an image display device and an image display method that are adapted to display information of an environmental factor surrounding a user, a storage medium, and an image display system.

We live while being surrounded by various environmental factors such as electromagnetic waves (such as ultraviolet rays, blue light, and radio waves), heat rays (infrared rays), radiation, air pollutants, nitrogen compounds (nicotine), particulate matter, pollen, and house dust. There may be a seriously harmful effect on health when we are continuously exposed to the environmental factors.

For example, there is a proposal of an environmental information display device that is provided with an environmental factor detector that detects information of an environmental factor, an environmental allowance limit calculator that calculates a limit of the environmental factor allowed for the human body or an environment, as a limit value, based on the plurality of pieces of information of the environmental factor detected by the environmental factor detector, and a level display that displays the information detected by the environmental factor detector as a present value, and that displays the limit value concurrently therewith (for example, see Japanese Unexamined Patent Application Publication No. 2006-275720). Even when the environmental information display device displays a present level of the environmental factor, a user does not understand where a source of electromagnetic waves or radioactivity is or where to go to find a region where the concentration of dust such as air pollutants and pollen is low. In other words, the user does not really understand which direction to go in and what behavior to perform to avoid the environmental factor.

In addition, there is a proposal of an ultraviolet measurement device that specifies and displays a preventive measure to prevent sunburn based on an ultraviolet irradiation time and an ultraviolet intensity (for example, see Japanese Unexamined Patent Application Publication No. 2011-203137). However, although the ultraviolet measurement device can display, as a preventive measure, an optimum sun protection factor (SPF) value of a sunscreen to prevent sunburn during irradiation, a user does not really understand where a light source of ultraviolet rays is, which direction to go in, and what behavior to perform to avoid ultraviolet rays.

In addition, there is a proposal of an environmental information provision device that calculates environmental load amounts indicating environmental loads produced by electric devices for a plurality of respective zones obtained by dividing an area, to provide the environmental load amounts and the environmental state information of the respective zones (for example, see Japanese Unexamined Patent Application Publication No. 2011-187030). The environmental information provision device expresses and displays a temperature distribution in a store with a height of a bar or a color variation according to a temperature for each zone. However, since a display device is disposed for each table in the store or disposed outside the store, it is necessary for a user to perform an operation of matching a display on the screen and a real visual field of the user to identify a high-temperature location or a low-temperature location in the real space. In other words, the user may not rapidly understand, from the display on the screen, which direction to go in within the store and what behavior to perform to be in a pleasant environment.

In addition, there is a proposal of an environment monitoring device that measures a carbon dioxide concentration and an oxygen concentration in the air in its periphery using a USB module for environment measurement provided with a $CO_2$ sensor and an $O_2$ sensor (for example, see Japanese Unexamined Patent Application Publication No. 2009-145059). The environment monitoring device can indicate the obtained carbon dioxide concentration and the like on the map. However, when a user does not specify a current position or direction of the user on the map, the user may not avoid a location in which the carbon dioxide concentration is high or may not go to a location in which the oxygen concentration is high.

SUMMARY

It is desirable to provide an excellent image display device and an excellent image display method capable of properly displaying information of an environmental factor surrounding a user, a storage medium, and an image display system.

According to a first embodiment of the present technology, there is provided a head- or face-mounted image display device including an environmental information acquisition unit that acquires environmental information, a state information acquisition unit that acquires state information, a guidance information generation unit that generates guidance information for guidance into a state in which the influence of environment is reduced or increased based on at least one piece of environmental information acquired for each state, and a provision unit that provides the guidance information.

According to a second embodiment of the present technology, in the image display device according to the first embodiment, the environmental information acquisition unit acquires information related to an environmental factor such as electromagnetic waves (such as ultraviolet rays, blue light, and radio waves), heat rays (infrared rays), radiation, carbon monoxide, carbon dioxide, oxygen, nitrogen oxide, nitrogen compounds (nicotine), hydrocarbons, particulate matter, photochemical smog, pollen, house dust, or negative ions to which a main body of the image display device or a user on which the image display device is mounted is exposed.

According to a third embodiment of the present technology, in the image display device according to the first embodiment, the guidance information generation unit generates guidance information for guidance into a state in which an environmental factor having an adverse influence on the image display device or a user on which the image display device is mounted is reduced, or guidance information for guidance into a state in which an environmental factor having a good influence on the image display device or the user on which the image display device is mounted is increased.

According to a fourth embodiment of the present technology, the image display device according to the first embodiment further includes an image display unit that displays an image, and the provision unit displays the guidance information on the image display unit.

According to a fifth embodiment of the present technology, in the image display device according to the fourth embodiment, the provision unit displays the guidance information on the image display unit in a superimposed manner on an image of a visual field of a user with the image display device mounted on a head or a face.

According to a sixth embodiment of the present technology, in the image display device according to the fifth embodiment, the provision unit displays, on the image display unit in a superimposed manner on the image of the visual field of the user, guidance information indicating a guidance direction in which the influence of environment is reduced or increased.

According to a seventh embodiment of the present technology, in the image display device according to the first embodiment, the state information acquisition unit acquires current state information of the image display device or a user on which the image display device is mounted, the environmental information acquisition unit acquires environmental information of the image display device or the user on which the image display device is mounted every time there is a change in the state information, and the guidance information generation unit generates guidance information based on the environmental information acquired for a predetermined time up to the current time.

According to an eighth embodiment of the present technology, in the image display device according to the first embodiment, the state information acquisition unit acquires state information related to a current position or posture of a main body of the image display device or a user on which the image display device is mounted, and the guidance information generation unit generates guidance information in the current position or posture, based on the environmental information acquired by the environmental information acquisition unit in a different position or posture.

According to a ninth embodiment of the present technology, in the image display device according to the first embodiment, the state information acquisition unit acquires state information related to a current position or posture of a main body of the image display device or a user on which the image display device is mounted and a temperature, and the guidance information generation unit generates guidance information in the current position or posture, based on the environmental information acquired by the environmental information acquisition unit in a different position or posture or at a different temperature.

According to a tenth embodiment of the present technology, in the image display device according to the first embodiment, the state information acquisition unit acquires current state information of the image display device or a user on which the image display device is mounted within a predetermined period of time, the environmental information acquisition unit acquires environmental information of the image display device or the user on which the image display device is mounted every time there is a change in the state information within the predetermined period of time, and the guidance information generation unit generates guidance information within the predetermined period of time based on the environmental information.

According to an eleventh embodiment of the present technology, the image display device according to the tenth embodiment stops at least a function in the image display device in a period of time other than the predetermined period of time.

According to a twelfth embodiment of the present technology, in the image display device according to the tenth embodiment, the state information acquisition unit acquires state information related to a current position or posture of a main body of the image display device or the user on which the image display device is mounted and a temperature, and the guidance information generation unit generates guidance information in the current position or posture, based on the environmental information acquired by the environmental information acquisition unit in a different position or posture or at a different temperature within the predetermined period of time.

According to a thirteenth embodiment of the present technology, the image display device according to the first embodiment further includes a storage unit that stores the environmental information acquired by the environmental information acquisition unit in association with state information at the time of acquisition, and the guidance information generation unit generates guidance information based on the environmental information stored in the storage unit.

According to a fourteenth embodiment of the present technology, the image display device according to the first embodiment further includes a communication unit that communicates with an external device that provides environmental information, the state information acquisition unit acquires environmental information from the external device through the communication unit, and the guidance information generation unit generates guidance information based on at least one piece of environmental information acquired through the communication unit.

According to a fifteenth embodiment of the present technology, the external device that communicates with the image display device according to the fourteenth embodiment includes at least one of another image display device or an information terminal other than the image display device that is mounted on another user, an information terminal that is installed in a mobile device, an information terminal that is fixed to a specific location, and a server that holds environmental information acquired by a plurality of information terminals.

According to a sixteenth embodiment of the present technology, in the image display device according to the first embodiment, the guidance information generation unit generates guidance information by mapping environmental information on a two-dimensional plane including a route scheduled by a user on which the image display device is mounted.

According to a seventeenth embodiment of the present technology, the image display device according to the sixteenth embodiment further includes a communication unit that communicates with an external device that provides environmental information, the state information acquisition unit acquires environmental information from the external device through the communication unit, and the guidance information generation unit generates guidance information in which environmental information at a plurality of points acquired through the communication unit is mapped in two dimensions.

According to an eighteenth embodiment of the present technology, in the image display device according to the sixteenth embodiment, the guidance information generation unit subjects environmental information of a point where environmental information may not be acquired on the route to an interpolation process.

According to a nineteenth embodiment of the present technology, there is provided an image display method including acquiring environmental information, acquiring state information, generating guidance information for guidance into a state in which the influence of environment is reduced or increased based on at least one piece of environmental information acquired for each state, and providing the guidance information.

According to a twentieth embodiment of the present technology, there is provided a storage medium that stores a computer program that is provided in a computer-readable form to cause a computer to function as an environmental information acquisition unit that acquires environmental information, a state information acquisition unit that acquires state information, a guidance information generation unit that generates guidance information for guidance into a state in which the influence of environment is reduced or increased based on at least one piece of environmental information acquired for each state, and a provision unit that provides the guidance information.

The storage medium according to the twentieth embodiment of the present technology is defined as a storage medium that stores a computer program that is provided in a computer-readable form to realize a predetermined process on a computer. In other words, by installing the computer program stored in the storage medium according to the twentieth embodiment of the present technology on the computer, a cooperative action is exhibited on the computer, and thus it is possible to obtain the same working effect as in the image display device according to the first embodiment of the present technology.

According to a 21st embodiment of the present technology, there is provided an image display system including one or more external devices that provide environmental information for each state, and a head- or face-mounted image display device that generates and provides guidance information for guidance into a state in which the influence of environment is reduced or increased based on at least one piece of environmental information acquired for itself or acquired from the external device.

The "system" mentioned herein is a system in which a plurality of devices (or functional modules that realize a specific function) are logically assembled, regardless of whether the devices or functional modules are within a single enclosure.

According to an embodiment of the present technology, it is possible to provide an excellent image display device and an excellent image display method capable of properly displaying information of an environmental factor surrounding a user, a storage medium, and an image display system.

The image display device according an embodiment of the present technology is mounted and used on a user's head or face to display information related to an environmental factor surrounding the user, for example, in a superimposed manner on a visual field of the user. Accordingly, the user can easily understand which direction to go in and what behavior to perform to reduce or increase the influence of the environmental factor.

In addition, the image display device according an embodiment of the present technology acquires information related to an environmental factor surrounding a user in real time and displays the information in a superimposed manner on a visual field of the user. Accordingly, the user can rapidly take an appropriate action to reduce or increase the influence of the environmental factor.

The image display device according an embodiment of the present technology can guide the user into a situation where the influence of the environmental factor can be reduced or increased, by predicting the environment at a future point based on the environmental factor-related information acquired up to the present time.

Other objects, features, and advantages of the present technology will be apparent using more detailed description based on embodiments, which will be described later, or the accompanying drawings.

BRIEF DESCRIPTION OF THE DRAWINGS

FIG. 21 is a flowchart showing processing procedures that are performed by image display devices in the communication system shown in FIG. 20;

DETAILED DESCRIPTION OF EMBODIMENTS

Hereinafter, embodiments of the present technology will be described in detail with reference to the drawings.

A. Configuration of Device

Figure 1:
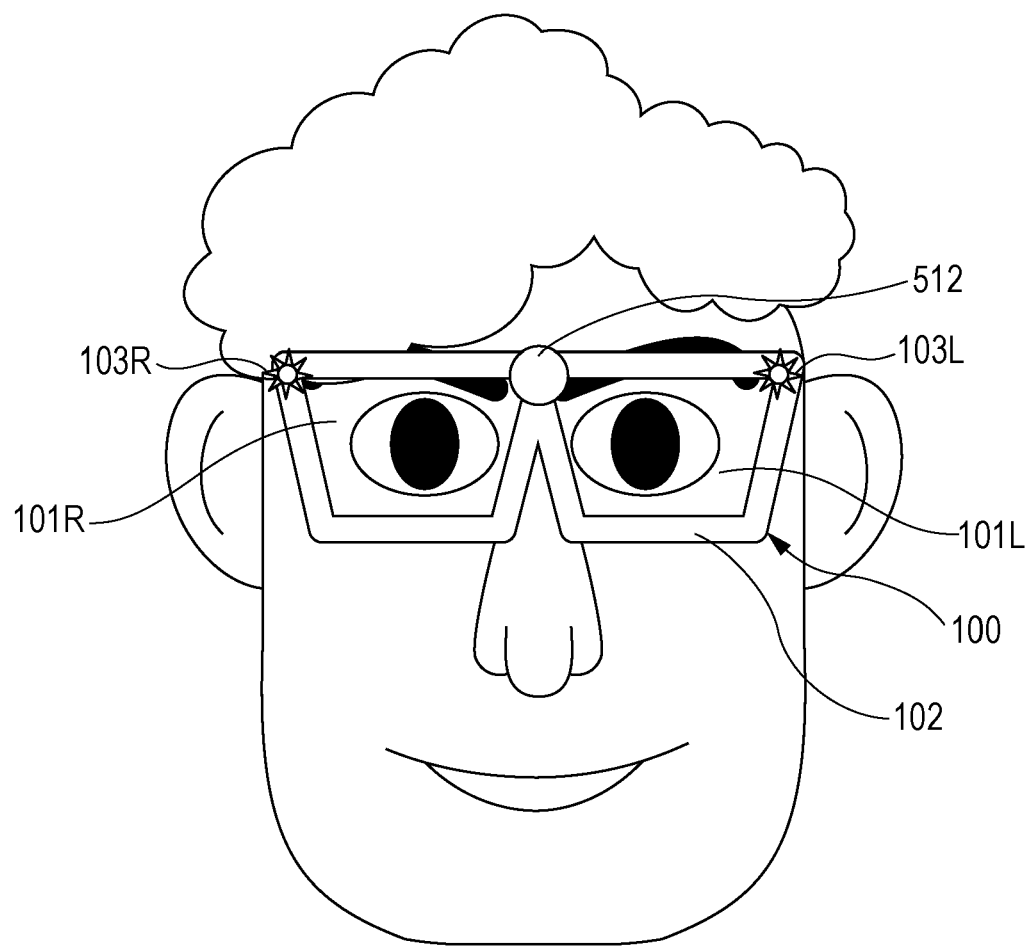
FIG. 1 is a diagram showing a user on which a transmission-type head-mounted image display device is mounted, as viewed from the front.

FIG. 1 shows an appearance configuration of an image display device 100 according to an embodiment of the present technology. The image display device 100 is mounted and used on a user's head or face to display an image for each of right and left eyes. The image display device 100 shown in FIG. 1 is a transmission type, that is, a see through type, and a user can view a landscape of the real world over an image (that is, in a see through manner) even during the display of the image. Accordingly, it is possible to show a virtual display image such as an augmented reality (AR) image in a superimposed manner on the landscape of the real world (for example, see Japanese Unexamined Patent Application Publication No. 2011-2753). In addition, since the display image is not shown from the outside (that is, to other people), privacy is easily attained during the display of information.

The image display device 100 shown in FIG. 1 has a structure similar to glasses for vision correction. Virtual image optical units 101L and 101R of a main body of the image display device 100, each formed of a transparent light guide unit, are positioned to be opposed to right and left eyes of a user, respectively, and images (not shown) to be observed by the user are displayed inside the virtual image optical units 101L and 101R. The virtual image optical units 101L and 101R are supported by, for example, a glasses frame-shaped support 102.

An external camera 512 for input of a surrounding image (a visual field of the user) is installed at approximately the center of the glasses frame-shaped support 102. The external camera 512 can capture an image of, for example, a landscape in a user's line-of-sight direction. It is more preferable that the external camera 512 be configured to include a plurality of cameras so as to acquire three-dimensional information of the surrounding image using parallax information.

Microphones 103L and 103R are installed adjacent to both right and left ends of the support 102. The microphones 103L and 103R are provided approximately symmetric with respect to each other, and thus only a voice (a voice of the user) localized to the center is recognized and can thus be separated from surrounding noise and speaking voices of other people, whereby, for example, it is possible to prevent a malfunction during operation by voice input.

Figure 2:
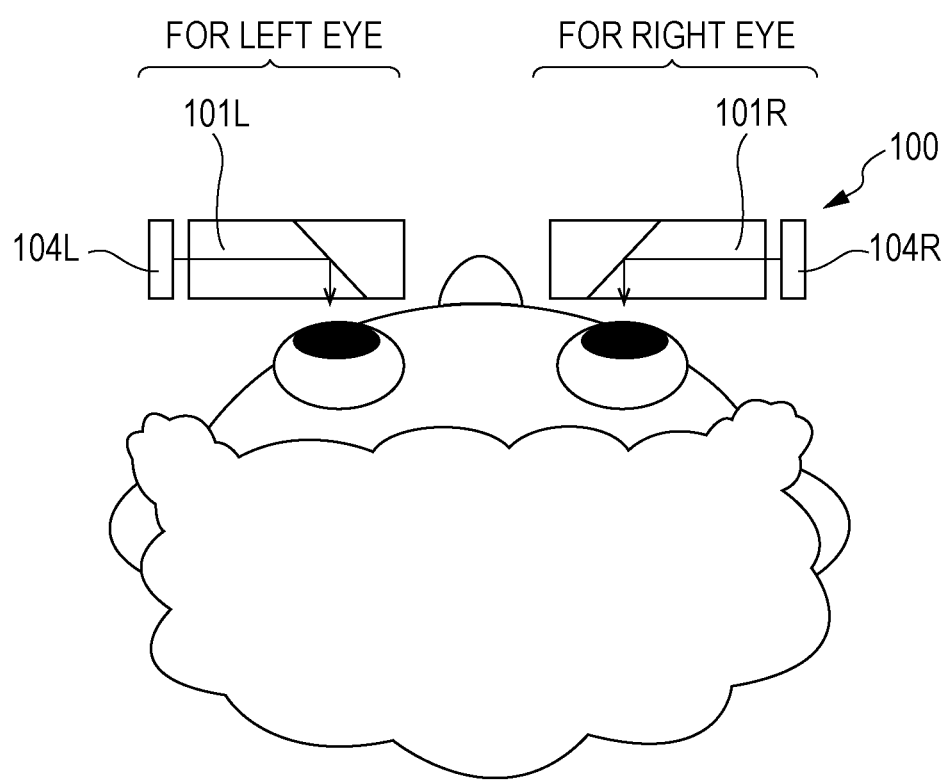
FIG. 2 is a diagram showing the user on which the image display device shown in FIG. 1 is mounted, as viewed from above.

FIG. 2 shows the image display device 100 mounted on the user, as viewed from above. As shown in FIG. 2, display panels 104L and 104R that display images for a left eye and a right eye, respectively, are disposed at both right and left ends of the image display device 100. Each of the display panels 104L and 104R is formed of a microdisplay such as a liquid crystal display or an organic EL element, or a laser scanning display such as a retina direct drawing display. The right and left display images that are output from the display panels 104L and 104R are guided to the vicinities of the right and left eyes by the virtual image optical units 101L and 101R, and their enlarged virtual images are formed on the pupils of the user. Although not shown in detail in FIG. 2, each of the virtual image optical units 101L and 101R includes an optical system that collects the light irradiated from the microdisplay, a light guide plate that is disposed at a position where the light passing through the optical system enters, a polarizing filter that reflects the light incident on the light guide plate, and a polarizing filter that allows the light fully reflected and propagated inside the light guide plate to be emitted toward the eyes of the user.

Figure 3:
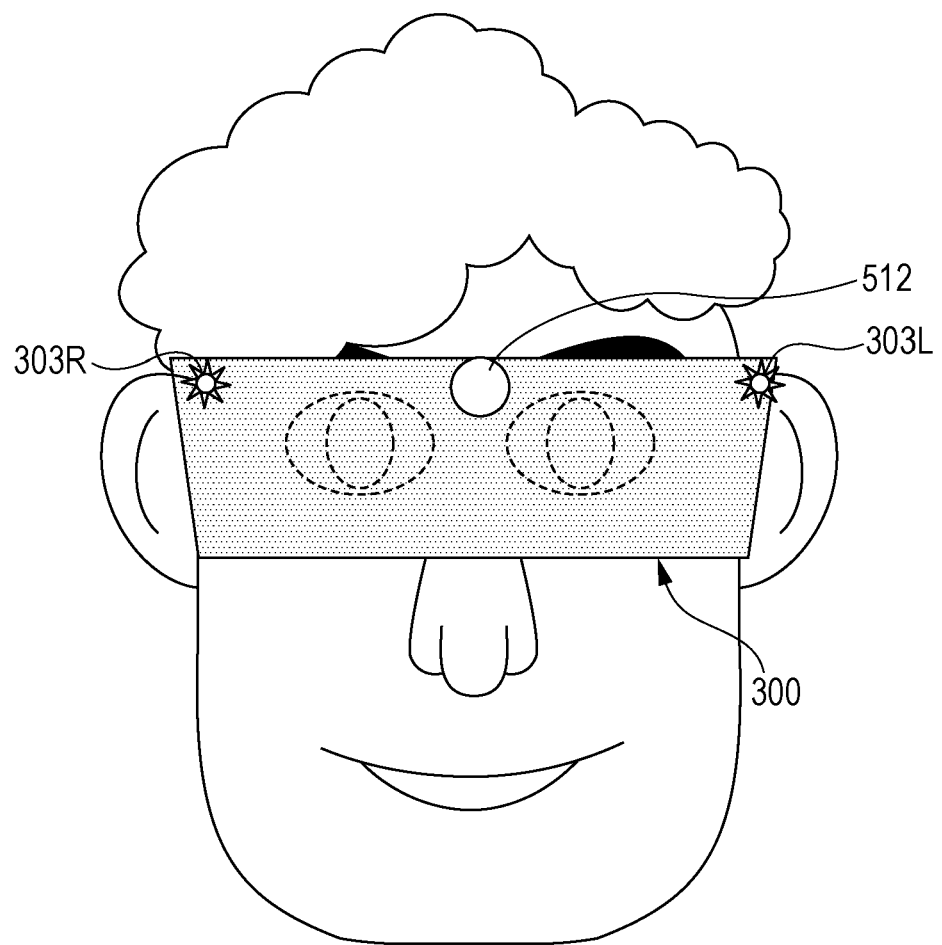
FIG. 3 is a diagram showing a user on which a light blocking-type head-mounted image display device is mounted, as viewed from the front.

FIG. 3 shows an appearance configuration of an image display device 300 according to another embodiment of the present technology. The image display device 300 is mounted and used on a user's head or face and is a light blocking type. When being mounted on the head, the image display device 300 directly covers eyes of the user, and thus it is possible to impart an immersion feeling to the user during viewing of an image. In addition, differently from the see through type, the user on which the image display device 300 is mounted may not directly view a landscape of the real world. However, the image display device 300 is provided with an external camera 512 that captures an image of a landscape in a user's line-of-sight direction to display the captured image, and thus the user can view the landscape of the real world indirectly (that is, in a video see through manner). On the video see through image, a virtual display image such as an AR image can be shown in a superimposed manner. In addition, since the display image is not shown from the outside (that is, to other people), privacy is easily attained during the display of information.

The image display device 300 shown in FIG. 3 has a structural body similar to a hat shape, and directly covers right and left eyes of the user on which the image display device 300 is mounted. Display panels (not shown in FIG. 3) to be observed by the user are positioned to be opposed to the right and left eyes, respectively, inside of a main body of the image display device 300. The display panel is configured to include a microdisplay such as an organic EL element or a liquid crystal display, or a laser scanning display such as a retina direct drawing display.

An external camera 512 for input of a surrounding image (a visual field of the user) is installed at approximately the center of the front surface of the main body of the image display device 300. Microphones 303L and 303R are installed adjacent to both right and left ends of the main body of the image display device 300, respectively. The microphones 303L and 303R are provided approximately symmetric with respect to each other, and thus only a voice (a voice of the user) localized to the center is recognized and can thus be separated from surrounding noise and speaking voices of other people, whereby, for example, it is possible to prevent a malfunction during operation by voice input.

Figure 4:
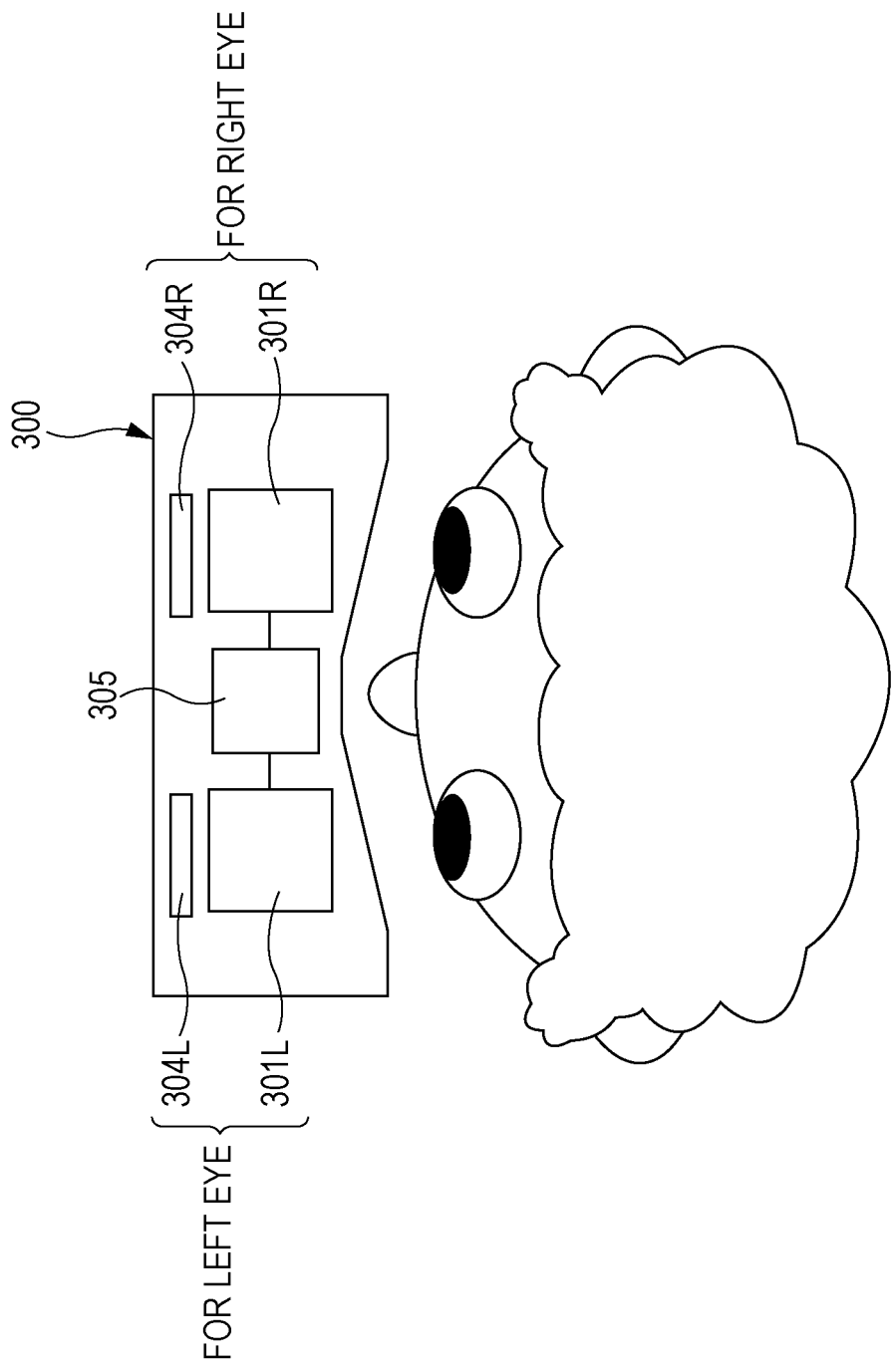
FIG. 4 is a diagram showing the user on which the image display device shown in FIG. 3 is mounted, as viewed from above.

FIG. 4 shows the user on which image display device 300 shown in FIG. 3 is mounted, as viewed from above. The image display device 300 shown in FIG. 4 has display panels 304L and 304R for a left eye and a right eye in a side surface opposed to the face of the user. Each of the display panels 304L and 304R is configured to include, for example, a microdisplay such as an organic EL element or a liquid crystal display, or a laser scanning display such as a retina direct drawing display. Display images of the display panels 304L and 304R are observed by the user as enlarged virtual images by passing through virtual image optical units 301L and 301R. In addition, since the eye height and the interpupillary distance vary between users, it is necessary to match the right and left display systems and the eyes of the user on which the image display device 300 is mounted. In the example shown in FIG. 4, an interpupillary distance adjuster 305 is provided between the display panel for a right eye and the display panel for a left eye.

Figure 5:
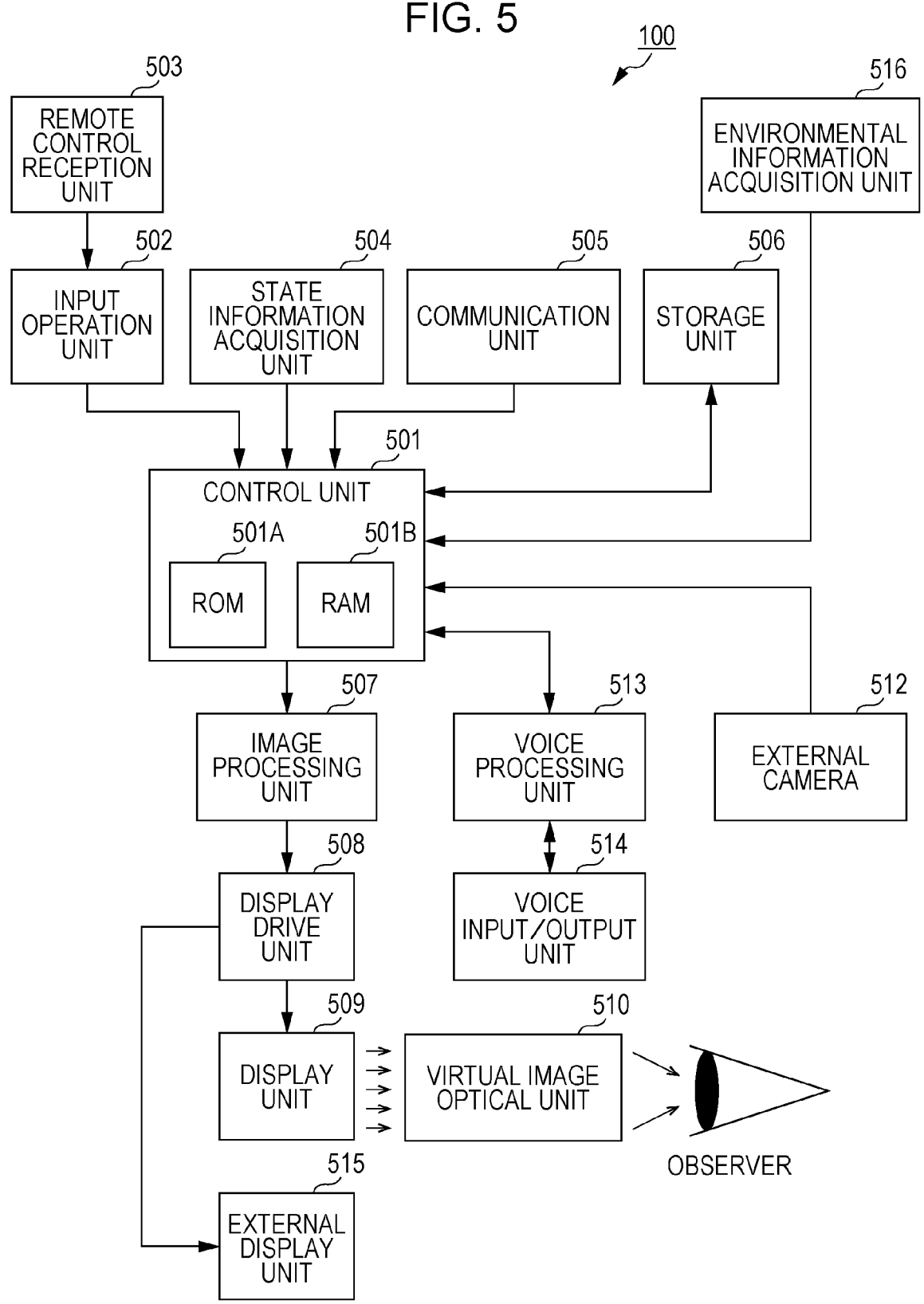
FIG. 5 is a diagram showing an example of an internal configuration of the image display device.

FIG. 5 shows an example of an internal configuration of the image display device 100. Another image display device 300 has the same internal configuration. Hereinafter, respective units will be described.

A control unit 501 is provided with a read only memory (ROM) 501A and a random access memory (RAM) 501B. Program codes that are executed by the control unit 501 and various data are stored in the ROM 501A. The control unit 501 executes a program loaded to the RAM 501B to start control of image display and to control the overall operation of the image display device 100 in a generalized manner. Examples of the programs and data stored in the ROM 501A include image display control programs, guidance information generation programs that are used to process information related to an environmental factor surrounding the device 100 (or the user on which the device 100 is mounted) and to generate guidance information (to be described later) for guidance into a state in which the influence of the environmental factor is reduced or increased, programs (to be described later) for communication processing with an external machine such as a server (not shown) on the internet, and unique identification information of the device 100.

An input operation unit 502 is provided with one or more operators such as a key, a button, and a switch that are used for an input operation of the user, receives a user's instruction through the operator, and outputs the instruction to the control unit 501. The input operation unit 502 receives, in the same manner, a user's instruction that is formed of a remote control command received by a remote control reception unit 503 and outputs the instruction to the control unit 501.

A state information acquisition unit 504 is a functional module that acquires state information of the main body of the image display device 100 or the user on which the device 100 is mounted. The state information acquisition unit 504 may be provided with various sensors for detecting state information, or may acquire state information through a communication unit 505 (to be described later) from an external machine (such as a smart phone or a watch of the user, or another multifunctional terminal) provided with some or all of the sensors.

The state information acquisition unit 504 detects a head position and a posture of the user, for example. Therefore, the state information acquisition unit 504 may be provided with any one of a gyro sensor, an acceleration sensor, a global positioning system (GPS) sensor, a geomagnetic sensor, a Doppler sensor, an infrared sensor, a radio wave intensity sensor, and the like, or a combination of two or more sensors in consideration of advantages and disadvantages of the sensors. In addition, in order to acquire position information, the state information acquisition unit 504 may use information such as mobile phone base station information and PlaceEngine (registered trade name) information (electric measurement information from a wireless LAN access point) provided from various infrastructures in combination.

In addition, the state information acquisition unit 504 acquires, as state information of the user on which the image display device 100 is mounted, a working state of the user (whether the image display device 100 is mounted or not), an action state of the user (a moving state such as standing still, walking, and running, an open/closed state of eyelids, a direction of eyes, and a pupil size), a mental state (an impression degree, an excitation degree, an awakening degree, feelings, emotions, and the like related to whether the user is preoccupied or concentrating during observation of a display image), and a physiological state. In order to acquire the state information from the user, the state information acquisition unit 504 may be provided with various state sensors and timers (not shown) such as a mounting sensor formed of a mechanical switch, an internal camera that captures an image of the face of the user, a gyro sensor, an acceleration sensor, a speed sensor, a pressure sensor, a temperature sensor that detects a body temperature or an air temperature, a sweating sensor, a myoelectric potential sensor, an ocular potential sensor, a brain wave sensor, an exhalation sensor, and a gas ion concentration sensor.

An environmental information acquisition unit 516 is a functional module that acquires information related to one or more environmental factors surrounding the main body of the image display device 100 or the user on which the device 100 is mounted. Examples of the environmental factors mentioned herein include electromagnetic waves (such as ultraviolet rays, blue light, and radio waves), heat rays (infrared rays), radiation, carbon monoxide and carbon dioxide in the atmosphere, oxygen, nitrogen compounds (nicotine), nitrogen oxide ($NO_X$) and hydrocarbons (volatile organic compounds (VOC)) floating in the atmosphere, photochemical smog that is formed by a photochemical reaction caused by the influence of ultraviolet rays on the foregoing substances, particulate matter, pollen, dust such as house dust, harmful chemical substances such as asbestos, noise, and negative ions to which the device 100 or the user is exposed. The environmental factors are classified into factors that may have an adverse influence on the health of the human body and of which the influence has to be reduced, and factors that are expected to have a good influence on the health of the human body and of which the influence has to be increased.

The environmental information acquisition unit 516 may be provided with various sensors for detecting the environmental factors. Otherwise, the environmental information acquisition unit 516 may acquire information related to the environmental factor through the communication unit 505 (to be described later) from an external machine (such as a smart phone or a watch of the user, or another multifunctional terminal) provided with some or all of the sensors or from a server that gathers environmental information.

For example, the external camera 512 is disposed at approximately the center of the front surface of the main body of the image display device 100 (see FIG. 1) to capture a surrounding image. In addition, the external camera 512 is controlled in pan, tilt, and posture in a roll direction in accordance with the user's line-of-sight direction detected by the state information acquisition unit 504, and thus an image in the user's own line-of-sight direction, that is, an image in the user's line-of-sight direction can be captured by the external camera 512. It is more preferable that the external camera 512 be configured to include a plurality of cameras so as to acquire three-dimensional information of the surrounding image using parallax information. The user can adjust the zoom of the external camera 512 through the operation of the input operation unit 502 and the input of a voice or a pupil size recognized by the internal camera. The image captured by the external camera 512 can be displayed on a display unit 509 and can also be stored in a storage unit 506.

The communication unit 505 performs a communication process with an external machine such as another image display device or multifunctional terminal or a server (not shown) on the internet, a process of subjecting a communication signal to modulation or demodulation, and a process of subjecting a communication signal to encoding or decoding. The control unit 501 sends data to be transmitted to the external machine from the communication unit 505. The communication unit 505 has an arbitrary configuration. For example, the communication unit 505 can be configured in accordance with a communication system that is used in the transmission and reception to and from the external machine serving as a communication partner. The communication system may have either wired or wireless forms. Examples of the communication standard mentioned herein include mobile high-definition link (MHL), universal serial bus (USB), high definition multimedia interface (HDMI), Wi-Fi (registered trade name), Bluetooth (registered trade name) communication, Bluetooth (registered trade name) low energy (BLE) communication, ultralow power consumption wireless communication such as ANT, mesh network based on IEEE802.11s or the like, infrared communication, human body communication, and signal transmission through conductive fiber.

The communication unit 505 may be a cellular wireless transceiver that is operated according to standards such as wideband code division multiple access (W-CDMA) and long term evolution (LTE).

The storage unit 506 is a mass-storage device formed of a solid state drive (SSD) or the like. The storage unit 506 stores application programs that are executed by the control unit 501 and various data. For example, environmental factor information acquired every hour up to the current point by the environmental information acquisition unit 516 is stored in the storage unit 506 in association with the state information such as a position and a posture acquired every hour by the state information acquisition unit 504. In addition, guidance information for guiding the user so that the influence of the environmental factor on the user is reduced or increased, or contents that becomes a base to generate the guidance information is stored in the storage unit 506.

An image processing unit 507 subjects an image signal output from the control unit 501 to a further signal process such as image quality correction, and performs conversion to a resolution according to the screen of the display unit 509. A display drive unit 508 sequentially selects pixels of the display unit 509 for each line and performs line sequential scanning to supply a pixel signal based on the image signal subjected to the signal process.

The display unit 509 has a display panel configured to include a microdisplay such as an organic electro-luminescence (EL) element or a liquid crystal display, or a laser scanning display such as a retina direct drawing display. A virtual image optical unit 510 enlarges and projects the display image of the display unit 509 so that the user observes the display image as an enlarged virtual image.

An external display unit 515 is installed so that a display screen thereof is toward the outside of the image display device 100 (in an opposite direction to the face of the user on which the image display device 100 is mounted) to display the same image as the display unit 509 or a different image to other users. See, for example, the specifications of Japanese Patent Application Nos. 2012-200902 and 2012-200903 already assigned to the applicant of the technology that disclose the detailed configuration of the external display unit 515.

A voice processing unit 513 subjects a voice signal output from the control unit 501 to sound quality correction or voice amplification and performs a further signal process of the input voice signal. A voice input/output unit 514 performs external output of the voice after the voice process and performs voice input from the microphone (described above).

The image display device 100 (the image display device 300) acquires information related to an environmental factor surrounding the user in real time through, for example, execution of an environmental information processing program by the control unit 501, and provides the information by displaying the information in a superimposed manner on a visual field of the user. In addition, the image display device 100 can guide the user into a situation where the influence of the environmental factor can be reduced or increased, by predicting the environment at a future point based on the environmental factor-related information acquired up to the present time. Hereinafter, several embodiments of the provision of the information related to the environmental factor (hereinafter, also referred to as "environmental information") to the user by the image display device 100 will be described in detail.

First Embodiment

Figure 6:
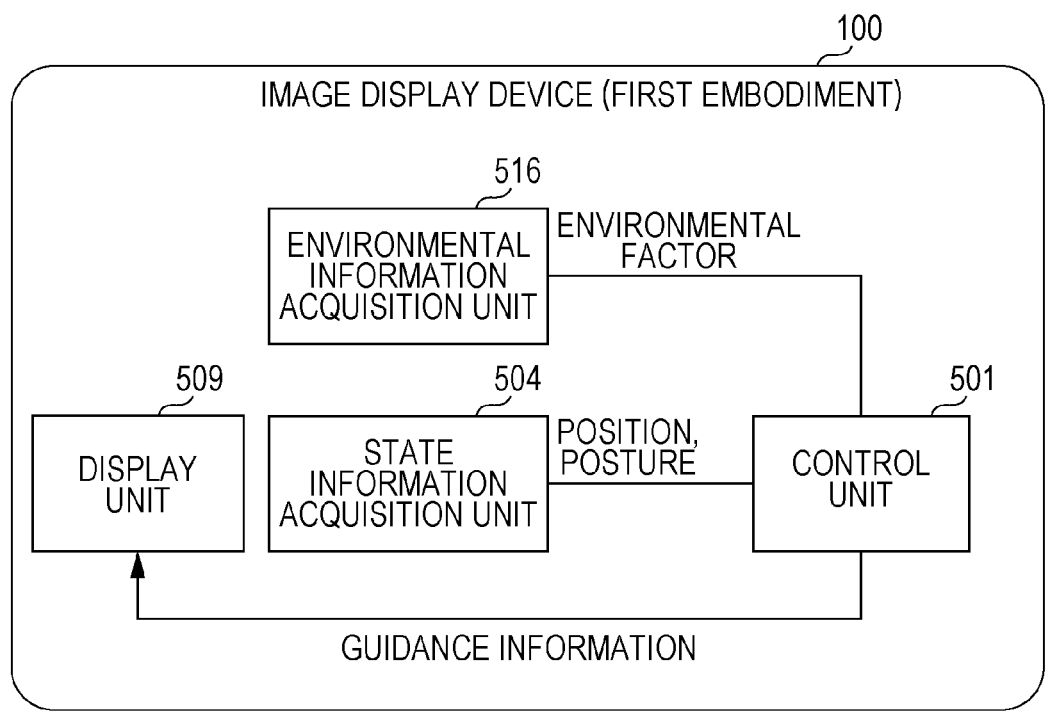
FIG. 6 is a diagram schematically showing a functional configuration according to a first embodiment of the image display device.

FIG. 6 schematically shows a functional configuration according to a first embodiment of the image display device 100.

The state information acquisition unit 504 acquires information of a current position and a current posture as a current state of the image display device 100 or the user on which the image display device 100 is mounted, and outputs the information to the control unit 501.

The environmental information acquisition unit 516 acquires information of an environmental factor such as electromagnetic waves (such as ultraviolet rays, blue light, and radio waves), heat rays (infrared rays), radiation, carbon monoxide, carbon dioxide, oxygen, nitrogen compounds (nicotine), nitrogen oxide, hydrocarbons, particulate matter, photochemical smog, pollen, house dust, and negative ions to which the image display device 100 or the user on which the image display device 100 is mounted is exposed currently, and outputs the information to the control unit 501.

The control unit 501 analyzes the user's state acquired by the state information acquisition unit 504 and the information of the environmental factor acquired by the environmental information acquisition unit 516. Specifically, a strength distribution of the environmental factor in the surrounding environment of the image display device 100 or the user on which the image display device 100 is mounted is taken based on a plurality of (a predetermined number of) environmental factors that are different in terms of the state such as a position and a posture at the time of acquisition. For example, when dealing with ultraviolet rays as an environmental factor, based on ultraviolet intensities in a plurality of states that are different in terms of the position or posture, a direction of a light source is specified, or which position to move to and which direction to go in to increase or reduce the intensity of the ultraviolet rays that are applied are understood. In addition, when dealing with photochemical smog or dust such as pollen as an environmental factor, a spatial distribution of the dust can be calculated based on the amount of the dust in a plurality of states that are different in terms of the position.

Next, based on the analysis result, the control unit 501 generates guidance information to guide the user into a state for reducing or increasing the influence of the environmental factor on the image display device 100 or the user on which the image display device 100 is mounted. For example, in the case of an environmental factor having an adverse influence on the health of the human body, guidance information for guiding the user into a state for reducing the influence of the environmental factor is generated, but in the case of an environmental factor having a good influence on the health of the human body, guidance information for guiding the user into a state for increasing the influence of the environmental factor is generated.

The control unit 501 displays the generated guidance information on the screen of the display unit 509. The control unit 501 may output the guidance information as a voice from the voice input/output unit 514 with the display on the screen. The control unit 501 may also display the guidance information on the external display unit 515 to share the guidance information with other users in the surroundings.

Figure 7:
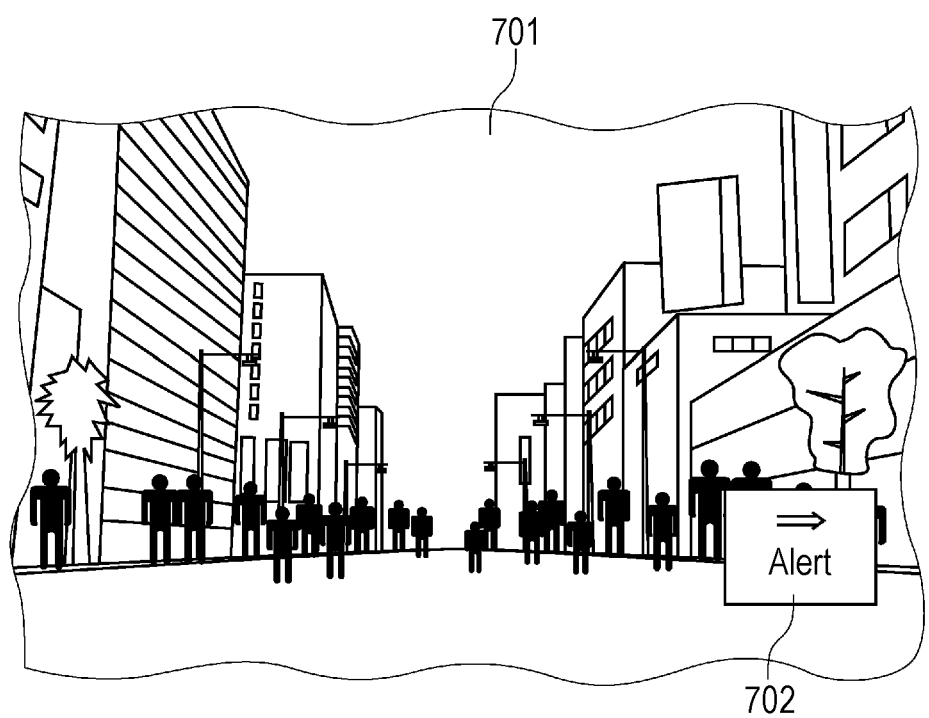
FIG. 7 is a diagram showing that guidance information is displayed in a superimposed manner on an image of a visual field of the user that is displayed in a see through manner.

FIG. 7 shows that the display unit 509 displays guidance information 702 in a superimposed manner on an image 701 of the visual field of the user that is displayed in a see through manner. In the example shown in FIG. 7, the environmental information acquisition unit 516 acquires the amount of ultraviolet rays as an environmental factor having an adverse influence on the human body, and the guidance information 702 for showing a direction in which the user has to move to reduce the ultraviolet rays that are applied is displayed as a sub-screen of the display unit 509.

For example, when the state information acquisition unit 504 detects that the user moves to the right based on the output information of the acceleration sensor, the environmental information acquisition unit 516 acquires information of the amount of ultraviolet rays at that time. Next, when the movement of the user to the left is detected, the environmental information acquisition unit 516 acquires information of the amount of ultraviolet rays at that time. The control unit 501 compares the ultraviolet level at which the user moves to the right with the ultraviolet level at which the user moves to the left. Here, when the amount of ultraviolet rays detected when the user moves to the left is larger, the guidance information 702 that is used to show the fact that the exposure to ultraviolet rays is reduced when the user moves to the right, that is, to promote a rightward movement or issue an alert is displayed as a sub-screen with respect to the original display screen (main screen) 701 as shown in FIG. 7.

Figure 8:
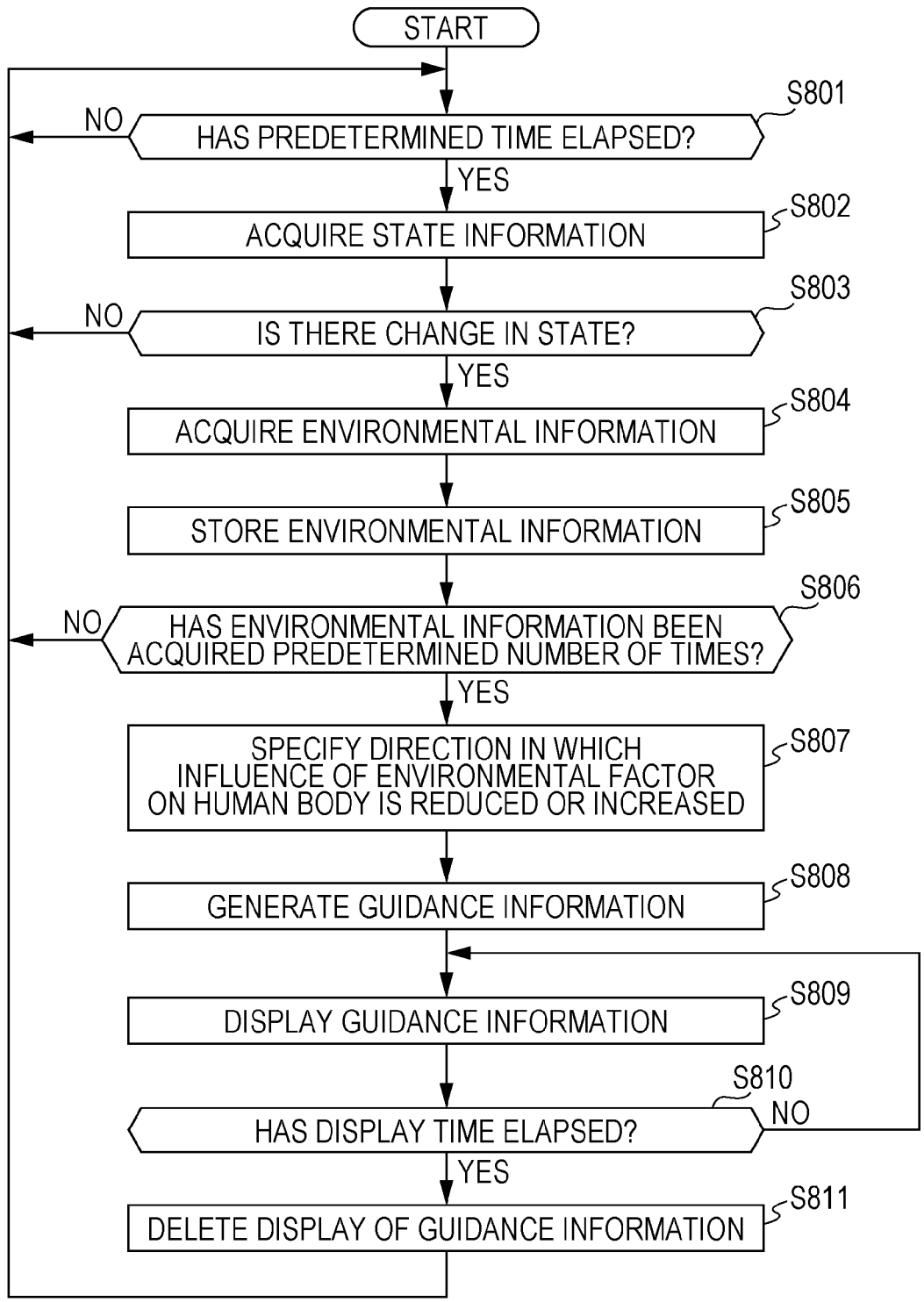
FIG. 8 is a flowchart showing processing procedures according to the first embodiment of the image display device.

FIG. 8 shows a flowchart showing processing procedures according to the first embodiment of the image display device 100.

Every time a predetermined time has elapsed (Yes in Step S801), the state information acquisition unit 504 acquires state information related to a position and a posture of the image display device 100 or the user on which the image display device 100 is mounted (Step S802), and checks whether there is a change in the position or posture from those of the previous time (Step S803). When Step S803 is initially executed (that is, when there is no information of the position and the posture of the previous time), it is regarded that a change is detected (that is, Yes in Step S803).

When no change is detected in the position or posture of the image display device 100 or the user on which the image display device 100 is mounted (No in Step S803), the process returns to Step S801 and waits until a predetermined time elapses next time.

When a change is detected in the position or posture of the image display device 100 or the user on which the image display device 100 is mounted (Yes in Step S803), the environmental information acquisition unit 516 acquires environmental information such as a dose of exposure to the ultraviolet rays of the image display device 100 or the user on which the image display device 100 is mounted (Step S804). When the environmental information is processed, the control unit 501 stores the information in the storage unit 506 or the like in association with the state information related to the position and the posture (Step S805).

It is checked whether the environmental information has been acquired a preset number of times (Step S806). When the environmental information has not been acquired a preset number of times (No in Step S806), the process returns to Step S801 to continuously acquire the environmental information.

When the environmental information has been acquired a preset number of times (Yes in Step S806), that is, when a predetermined number of pieces of environmental information that are different in terms of the position or posture can be acquired, the control unit 501 analyzes the information acquired until that time to take a strength distribution of the environmental factor in the surrounding environment of the image display device 100 or the user on which the image display device 100 is mounted. Based on the strength distribution of the environmental factor, the control unit 501 calculates a direction in which the environmental factor is reduced in the case of the environmental factor having an adverse influence on the human body, or calculates a direction in which the environmental factor is increased in the case of the environmental factor having a good influence on the human body (Step S807).

Next, when guidance information for guiding the user so that the influence of the environmental factor on the user is reduced or increased is generated based on the calculated direction (Step S808), the control unit 501 displays the guidance information as, for example, a sub-screen (see FIG. 7) on the display unit 509 (Step S809). The guidance information may also be displayed on the external display unit 515.

When the display of the guidance information is conducted for a predetermined display time and terminated (Yes in Step S810), the display of the guidance information is deleted from the screen of the display unit 509 (Step S811), and then the process returns to Step S801 to repeatedly execute the above-described process.

According to the first embodiment, the image display device 100 can provide guidance information for guiding the user so that the influence of the environmental factor on the user is reduced or increased, by acquiring information related to the environmental factor surrounding the user in real time. In addition, since the guidance information is displayed in a superimposed manner on the visual field of the user, the user can rapidly take an appropriate action to reduce or increase the influence of the environmental factor.

Second Embodiment

Figure 9:
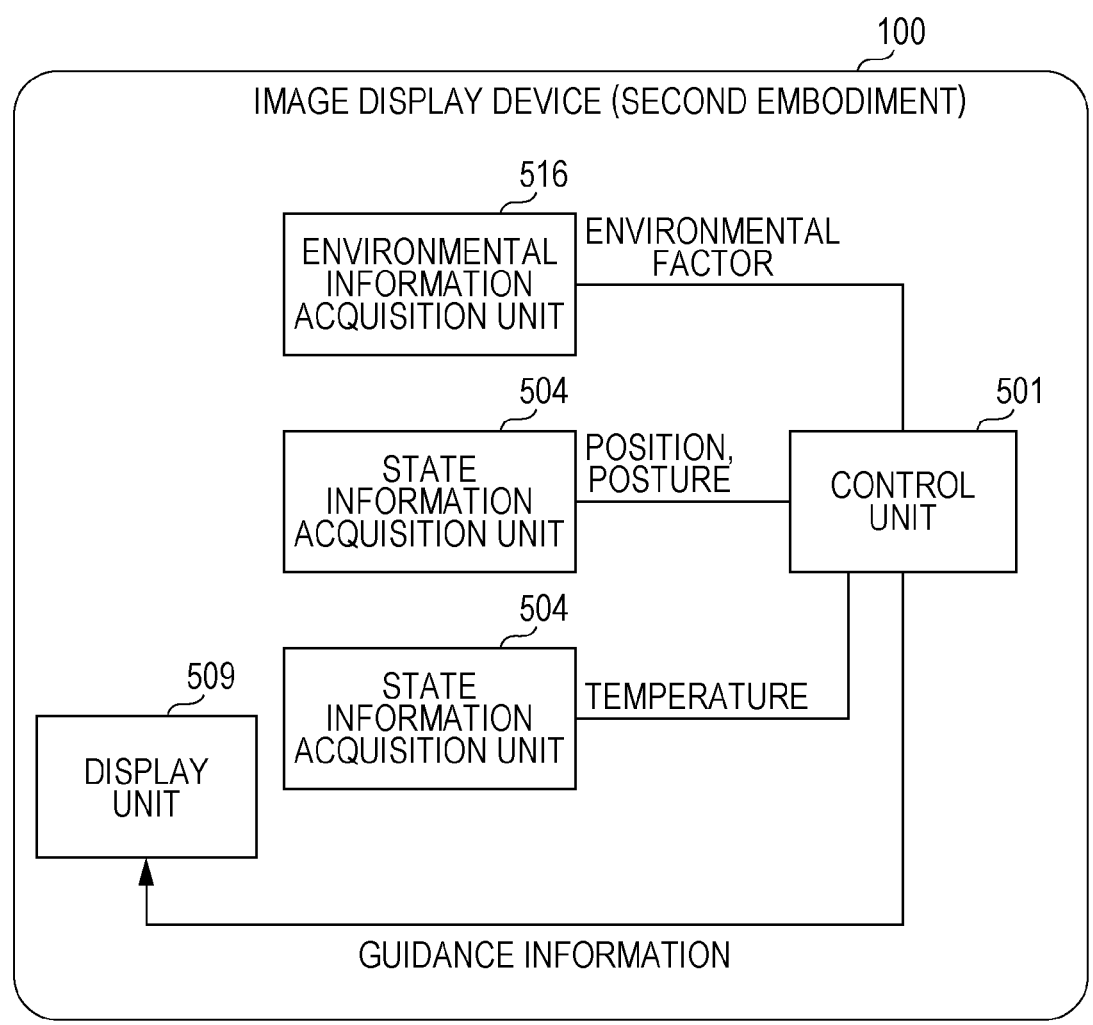
FIG. 9 is a diagram schematically showing a functional configuration according to a second embodiment of the image display device.

FIG. 9 schematically shows a functional configuration according to a second embodiment of the image display device 100.

The state information acquisition unit 504 acquires information of a current position and a current posture as a current state of the image display device 100 or the user on which the image display device 100 is mounted, and outputs the information to the control unit 501.

In addition, the state information acquisition unit 504 acquires a temperature (air temperature) of a location in which the image display device 100 or the user on which the image display device 100 is mounted is placed, and outputs the temperature to the control unit 501.

The environmental information acquisition unit 516 acquires information of an environmental factor such as electromagnetic waves (such as ultraviolet rays, blue light, and radio waves), heat rays (infrared rays), radiation, carbon monoxide, carbon dioxide, oxygen, nitrogen compounds (nicotine), nitrogen oxide, hydrocarbons, particulate matter, photochemical smog, pollen, house dust, and negative ions to which the image display device 100 or the user on which the image display device 100 is mounted is exposed currently, and outputs the information to the control unit 501.

The control unit 501 takes a strength distribution of the environmental factor in the surrounding environment of the image display device 100 or the user on which the image display device 100 is mounted, based on the user's state acquired by the state information acquisition unit 504 and the information of the environmental factor acquired by the environmental information acquisition unit 516. Next, based on the analysis result, the control unit 501 generates guidance information for guiding the user into a state for reducing or increasing the influence of the environmental factor. For example, in the case of an environmental factor having an adverse influence on the health of the human body, guidance information for guiding the user into a state for reducing the influence of the environmental factor is generated, but in the case of an environmental factor having a good influence on the health of the human body, guidance information for guiding the user into a state for increasing the influence of the environmental factor is generated.

The control unit 501 displays the generated guidance information on the screen of the display unit 509. The control unit 501 may output the guidance information as a voice from the voice input/output unit 514 in place of or with the display on the screen. The control unit 501 may also display the guidance information on the external display unit 515 to share the guidance information with other users in the surroundings.

Figure 10:
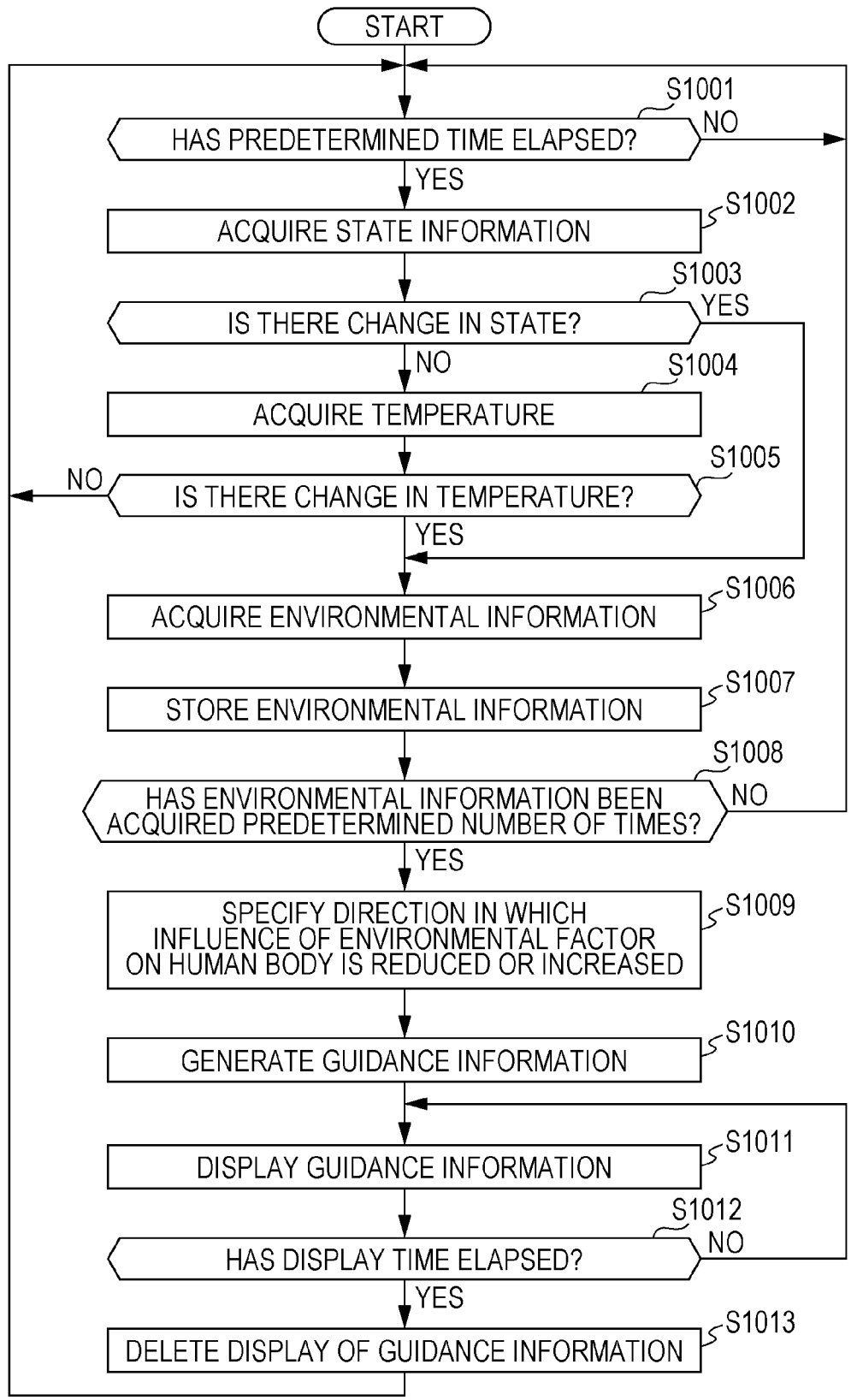
FIG. 10 is a flowchart showing processing procedures according to the second embodiment of the image display device.

FIG. 10 shows a flowchart showing processing procedures according to the second embodiment of the image display device 100.

Every time a predetermined time has elapsed (Yes in Step S1001), the state information acquisition unit 504 acquires state information related to a position and a posture of the image display device 100 or the user on which the image display device 100 is mounted (Step S1002), and checks whether there is a change in the position or posture from those of the previous time (Step S1003). When Step S1003 is initially executed (that is, when there is no information of the position and the posture of the previous time), it is regarded that a change is detected (that is, Yes in Step S1003).

When no change is detected in the position or posture of the image display device 100 or the user on which the image display device 100 is mounted (No in Step S1003), the state information acquisition unit 504 acquires a temperature (air temperature) of a location in which the image display device 100 or the user on which the image display device 100 is mounted is placed (Step S1004), and further checks whether there is a change in the temperature (Step S1005). Here, when no change is detected in the position or posture of the image display device 100 or the user on which the image display device 100 is mounted and there is also no change in the temperature (No in Step S1005), the process returns to Step S1001 and waits until a predetermined time elapses next time.

When a change is detected in the position or posture of the image display device 100 or the user on which the image display device 100 is mounted (Yes in Step S1003), the environmental information acquisition unit 516 acquires environmental information such as a dose of exposure to the ultraviolet rays of the image display device 100 or the user on which the image display device 100 is mounted (Step S1006).

Since it is assumed that even when there is no change in the position or posture of the image display device 100 or the user on which the image display device 100 is mounted (No in Step S1003), when a change is detected in the temperature (Yes in Step S1005), the influence of the environmental factor is also changed due to the change in the temperature, the environmental information acquisition unit 516 acquires environmental information every time there is a change in the temperature (Step S1006).

When the environmental information is processed, the control unit 501 stores the information in the storage unit 506 or the like in association with the state information related to the position, the posture, and the temperature (Step S1007).

Next, it is checked whether the environmental information has been acquired a preset number of times (Step S1008). When the environmental information has not been acquired a preset number of times (No in Step S1008), the process returns to Step S1001 to continuously acquire the environmental information.

When the environmental information has been acquired a preset number of times (Yes in Step S1008), that is, when a predetermined number of pieces of environmental information that are different in terms of the position, posture, or temperature can be acquired, the control unit 501 analyzes the information acquired until that time to take a strength distribution of the environmental factor in the surrounding environment of the image display device 100 or the user on which the image display device 100 is mounted. Based on the strength distribution of the environmental factor, the control unit 501 calculates a direction in which the environmental factor is reduced in the case of the environmental factor having an adverse influence on the human body, or calculates a direction in which the environmental factor is increased in the case of the environmental factor having a good influence on the human body (Step S1009).

Next, when guidance information for guiding the user so that the influence of the environmental factor on the user is reduced or increased is generated based on the calculated direction (Step S1010), the control unit 501 displays the guidance information as, for example, a sub-screen (see FIG. 7) on the display unit 509 (Step S1011). The guidance information may also be displayed on the external display unit 515.

When the display of the guidance information is conducted for a predetermined display time and terminated (Yes in Step S1012), the display of the guidance information is deleted from the screen of the display unit 509 (Step S1013), and then the process returns to Step S1001 to repeatedly execute the above-described process.

According to the second embodiment, the image display device 100 can provide guidance information for guiding the user so that the influence of the environmental factor on the user is reduced or increased, by acquiring information related to the environment surrounding the user in real time. Here, since the image display device 100 can acquire the environmental information every time there is a change not only in the position or posture of the image display device 100 or the user on which the image display device 100 is mounted, but also in the temperature (air temperature), the influence of the environmental factor corresponding to the temperature (air temperature) can be provided to the user.

In addition, since the guidance information is displayed in a superimposed manner on the visual field of the user, the user can rapidly take an appropriate action to reduce or increase the influence of the environmental factor.

Third Embodiment

This embodiment is different from the above described embodiments in that the control unit 501 conducts analysis of the environmental factor and provision of guidance information in a restricted period of time (or season) in which the influence of a target environmental factor on the human body is large, based on time information input from the state information acquisition unit 504. For example, when dealing with ultraviolet rays or photochemical smog as an environmental factor, the control unit 501 conducts analysis of the environmental factor and provision of guidance information in a period of time restricted to noon during which the sunlight is strong, evening during which the sunlight of the setting sun is strong, or the like.

Figure 11:
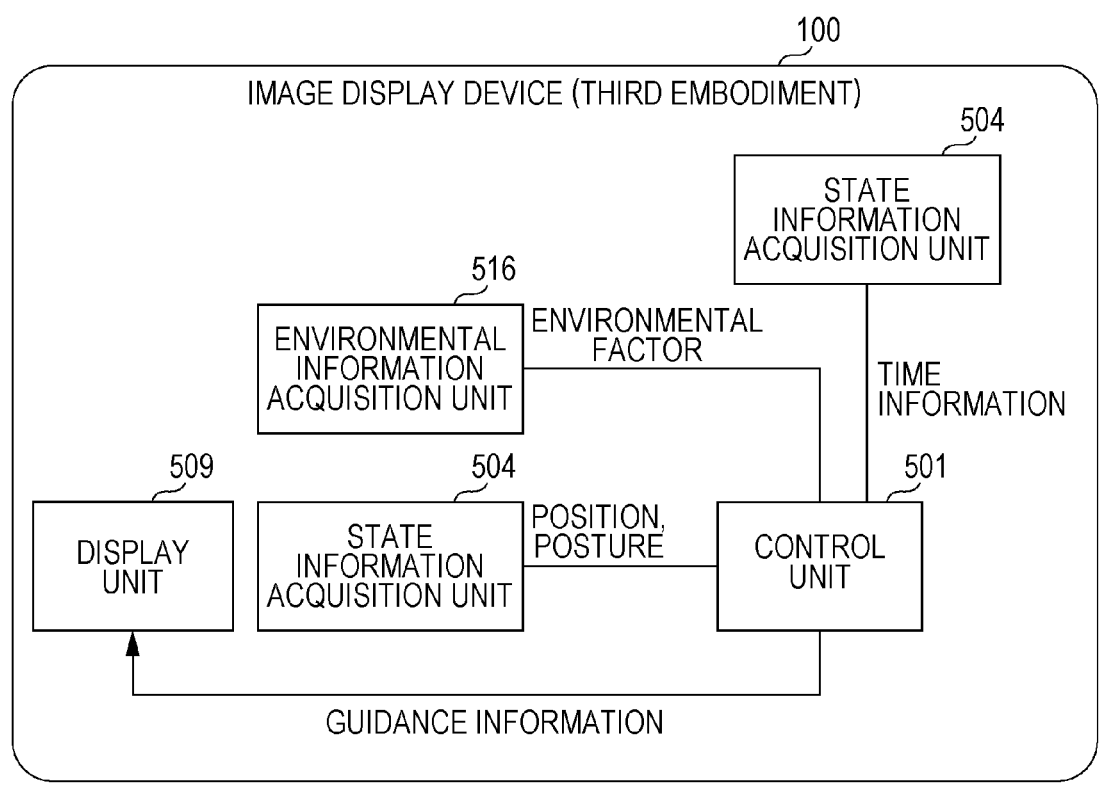
FIG. 11 is a diagram schematically showing a functional configuration according to a third embodiment of the image display device.

FIG. 11 schematically shows a functional configuration according to a third embodiment of the image display device 100.

The state information acquisition unit 504 acquires information of a current position and a current posture as a current state of the image display device 100 or the user on which the image display device 100 is mounted, and outputs the information to the control unit 501.

In addition, the state information acquisition unit 504 acquires information of a current time, and outputs the information to the control unit 501.

The environmental information acquisition unit 516 acquires information of an environmental factor such as electromagnetic waves (such as ultraviolet rays, blue light, and radio waves), heat rays (infrared rays), radiation, carbon monoxide, carbon dioxide, oxygen, nitrogen compounds (nicotine), nitrogen oxide, hydrocarbons, particulate matter, photochemical smog, pollen, house dust, and negative ions to which the image display device 100 or the user on which the image display device 100 is mounted is exposed currently, and outputs the information to the control unit 501.

The control unit 501 determines whether the current time is within a predetermined period of time. The control unit 501 takes a strength distribution of the environmental factor in the surrounding environment of the image display device 100 or the user on which the image display device 100 is mounted, based on the user's state acquired by the state information acquisition unit 504 and the information of the environmental factor acquired by the environmental information acquisition unit 516 within the predetermined period of time. Next, based on the analysis result, the control unit 501 generates guidance information for guiding the user into a state for reducing or increasing the influence of the environmental factor. For example, in the case of an environmental factor having an adverse influence on the health of the human body, guidance information for guiding the user into a state for reducing the influence of the environmental factor is generated, but in the case of an environmental factor having a good influence on the health of the human body, guidance information for guiding the user into a state for increasing the influence of the environmental factor is generated.

The control unit 501 displays the generated guidance information in the predetermined period of time on the screen of the display unit 509. The control unit 501 may output the guidance information as a voice from the voice input/output unit 514 in place of or with the display on the screen. The control unit 501 may also display the guidance information on the external display unit 515 to share the guidance information with other users in the surroundings.

Figure 12:
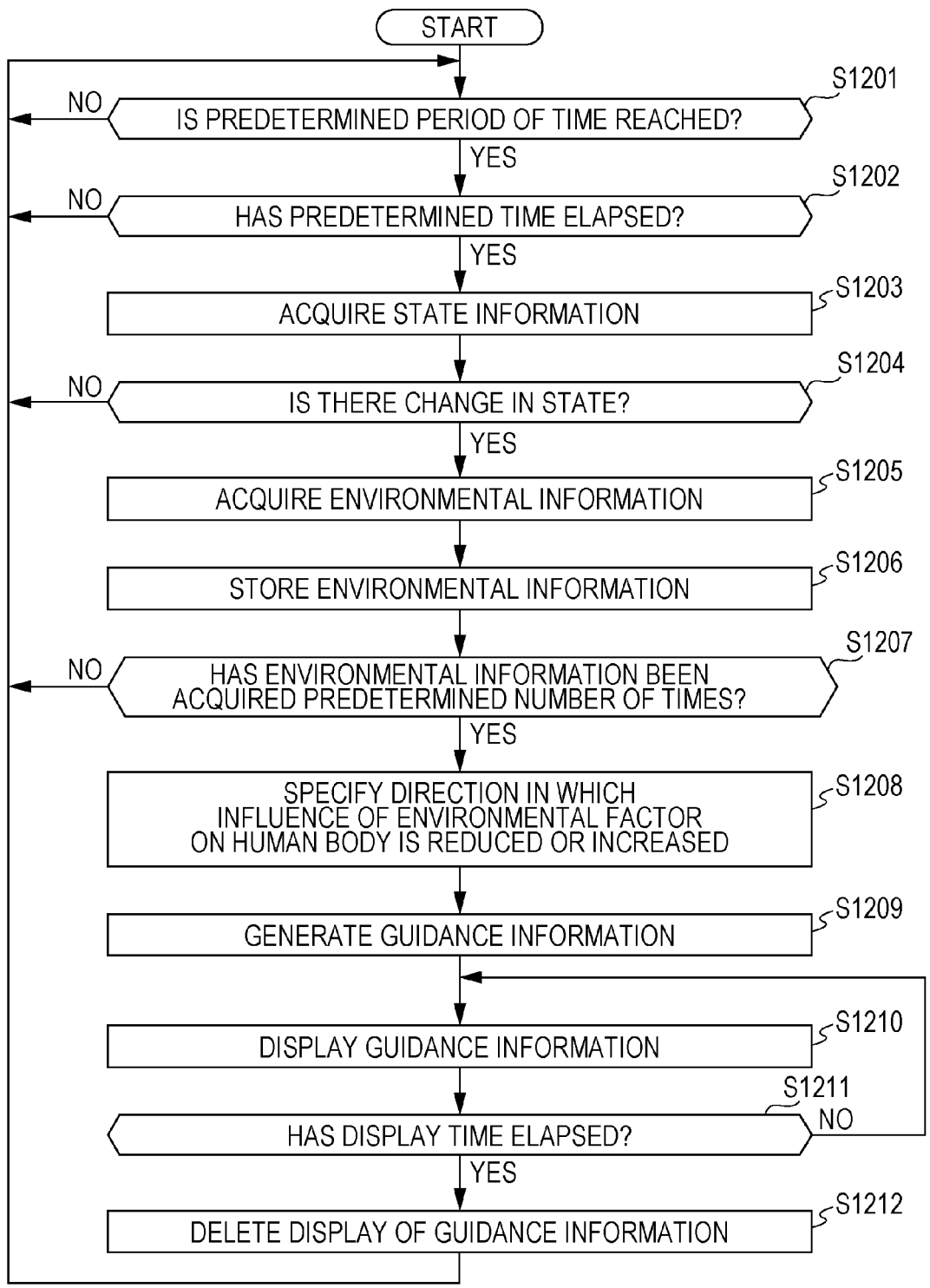
FIG. 12 is a flowchart showing processing procedures according to the third embodiment of the image display device.

FIG. 12 shows a flowchart showing processing procedures according to the third embodiment of the image display device 100.

The control unit 501 waits to start the process until a predetermined period of time is reached (No in Step S1201). The predetermined period of time mentioned herein is a period of time (or season) in which the influence of a target environmental factor on the human body is large. For example, when dealing with ultraviolet rays or photochemical smog as an environmental factor, the period of time corresponds to a period of time such as noon during which the sunlight is strong or evening during which the sunlight of the setting sun is strong. Until the predetermined period of time is reached, the control unit 501 or the image display device 100 may be switched to a sleep mode in which at least some functions are stopped to achieve low power consumption.

Every time a predetermined time has elapsed (Yes in Step S1202) within the predetermined period of time (Yes in Step S1201), the state information acquisition unit 504 acquires state information related to a position and a posture of the image display device 100 or the user on which the image display device 100 is mounted (Step S1203), and checks whether there is a change in the position or posture from those of the previous time (Step S1204). When Step S1203 is initially executed (that is, when there is no information of the position and the posture of the previous time), it is regarded that a change is detected (that is, Yes in Step S1204).

When no change is detected in the position or posture of the image display device 100 or the user on which the image display device 100 is mounted (No in Step S1204), the process returns to Step S1201 and waits until a predetermined time elapses next time within the predetermined period of time.

When a change is detected in the position or posture of the image display device 100 or the user on which the image display device 100 is mounted (Yes in Step S1204), the environmental information acquisition unit 516 acquires environmental information such as a dose of exposure to the ultraviolet rays of the image display device 100 or the user on which the image display device 100 is mounted (Step S1205). Next, when the environmental information is processed, the control unit 501 stores the information in the storage unit 506 or the like in association with the state information related to the position and the posture (Step S1206).

It is checked whether the environmental information has been acquired a preset number of times within a predetermined time (Step S1207). When the environmental information has not been acquired a preset number of times (No in Step S1207), the process returns to Step S1201 to continuously acquire the environmental information within the predetermined time.

When the environmental information has been acquired a preset number of times (Yes in Step S1207), that is, when a predetermined number of pieces of environmental information that are different in terms of the position or posture can be acquired, the control unit 501 analyzes the information acquired until that time to take a strength distribution of the environmental factor in the surrounding environment of the image display device 100 or the user on which the image display device 100 is mounted. Based on the strength distribution of the environmental factor, the control unit 501 calculates a direction in which the environmental factor is reduced in the case of the environmental factor having an adverse influence on the human body, or calculates a direction in which the environmental factor is increased in the case of the environmental factor having a good influence on the human body (Step S1208). For example, a direction in which the influence of ultraviolet rays or photochemical smog on the user is increased in a period of time such as noon during which the sunlight is strong or evening during which the sunlight of the setting sun is strong is calculated.

Next, when guidance information for guiding the user so that the influence of the environmental factor on the user is reduced or increased is generated based on the calculated direction (Step S1209), the control unit 501 displays the guidance information as, for example, a sub-screen (see FIG. 7) on the display unit 509 (Step S1210). The guidance information may include information related to the period of time in which the guidance is conducted. The guidance information may also be displayed on the external display unit 515.

When the display of the guidance information is conducted for a predetermined display time and terminated (Yes in Step S1211), the display of the guidance information is deleted from the screen of the display unit 509 (Step S1212), and then the process returns to Step S1201 to repeatedly execute the above-described process within the predetermined period of time.

According to the third embodiment, the image display device 100 can provide, in a timely manner, guidance information for guiding the user so that the influence of the environmental factor on the user is reduced or increased, by acquiring information related to the environmental factor in real time particularly in a period of time (or season) in which the influence of the environmental factor on the human body is large.

In addition, since the guidance information is displayed in a superimposed manner on the visual field of the user in a particularly important period of time, the user can rapidly take an appropriate action to reduce or increase the influence of the environmental factor. The user does not receive guidance information having less effect in an unnecessary period of time.

Fourth Embodiment

This embodiment is different from the above described embodiments in that the control unit 501 conducts analysis of the environmental factor and provision of guidance information in a restricted period of time (or season) in which the influence of a target environmental factor on the human body is large, based on time information input from the state information acquisition unit 504. For example, when dealing with ultraviolet rays or photochemical smog as an environmental factor, the control unit 501 conducts analysis of the environmental factor and provision of guidance information within a period of time restricted to noon during which the sunlight is strong, evening during which the sunlight of the setting sun is strong, or the like. In addition, this embodiment is different from the above-described third embodiment in terms of the fact that environmental information is acquired in consideration not only of a change in the position or posture of the image display device 100 or the user on which the image display device 100 is mounted, but also of a change in the temperature.

Figure 13:
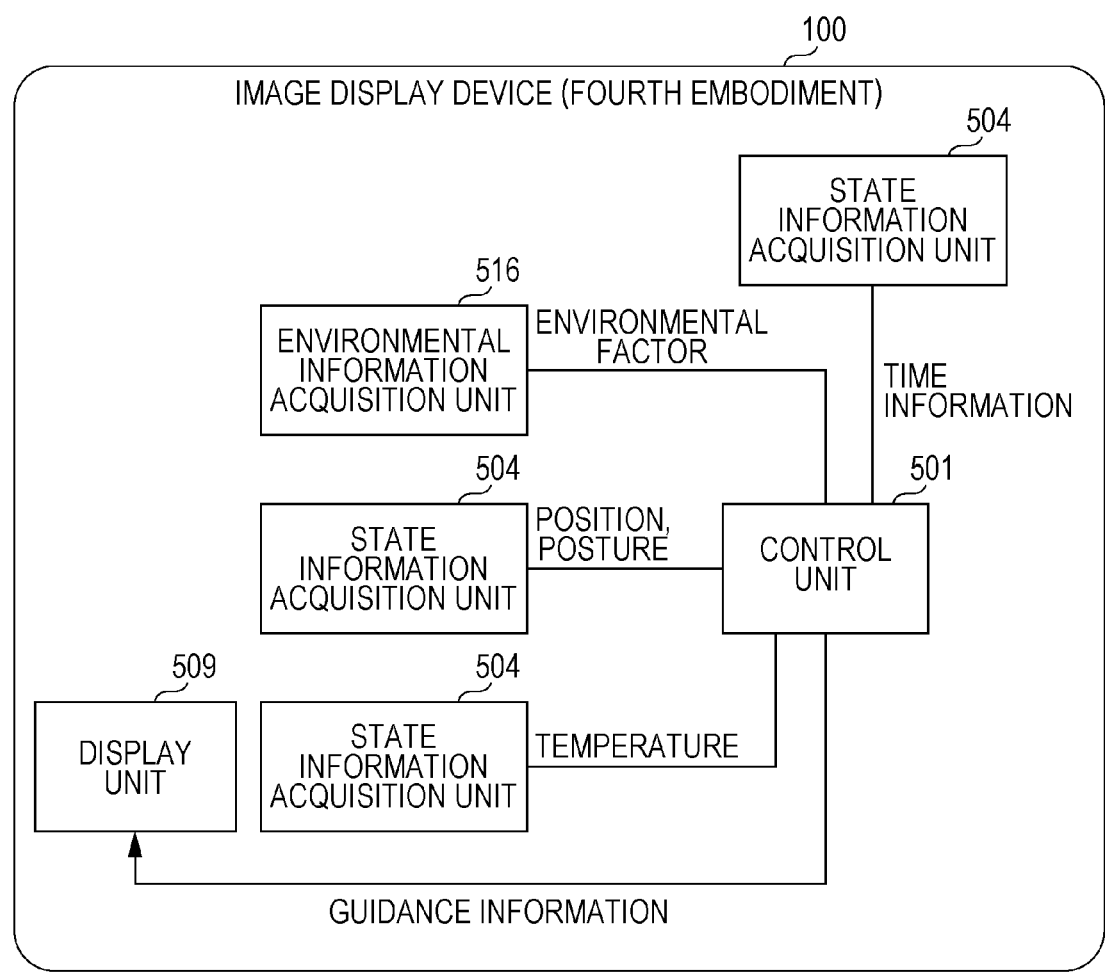
FIG. 13 is a diagram schematically showing a functional configuration according to a fourth embodiment of the image display device.

FIG. 13 schematically shows a functional configuration according to a fourth embodiment of the image display device 100.

The state information acquisition unit 504 acquires information of a current position and a current posture as a current state of the image display device 100 or the user on which the image display device 100 is mounted, and outputs the information to the control unit 501.

In addition, the state information acquisition unit 504 acquires a temperature (air temperature) of a location in which the image display device 100 or the user on which the image display device 100 is mounted is placed, and outputs the temperature to the control unit 501.

In addition, the state information acquisition unit 504 acquires information of a current time, and outputs the information to the control unit 501.

The environmental information acquisition unit 516 acquires information of an environmental factor such as electromagnetic waves (such as ultraviolet rays, blue light, and radio waves), heat rays (infrared rays), radiation, carbon monoxide, carbon dioxide, oxygen, nitrogen compounds (nicotine), nitrogen oxide, hydrocarbons, particulate matter, photochemical smog, pollen, house dust, and negative ions to which the image display device 100 or the user on which the image display device 100 is mounted is exposed currently, and outputs the information to the control unit 501.

The control unit 501 determines whether the current time is within a predetermined period of time. The control unit 501 takes a strength distribution of the environmental factor in the surrounding environment of the image display device 100 or the user on which the image display device 100 is mounted, based on the user's state acquired by the state information acquisition unit 504 and the information of the environmental factor acquired by the environmental information acquisition unit 516 within the predetermined period of time. Next, based on the analysis result, the control unit 501 generates guidance information for guiding the user into a state for reducing or increasing the influence of the environmental factor. For example, in the case of an environmental factor having an adverse influence on the health of the human body, guidance information for guiding the user into a state for reducing the influence of the environmental factor is generated, but in the case of an environmental factor having a good influence on the health of the human body, guidance information for guiding the user into a state for increasing the influence of the environmental factor is generated.

The control unit 501 displays the generated guidance information on the screen of the display unit 509. The control unit 501 may output the guidance information as a voice from the voice input/output unit 514 in place of or with the display on the screen. The control unit 501 may also display the guidance information on the external display unit 515 to share the guidance information with other users in the surroundings.

Figure 14:
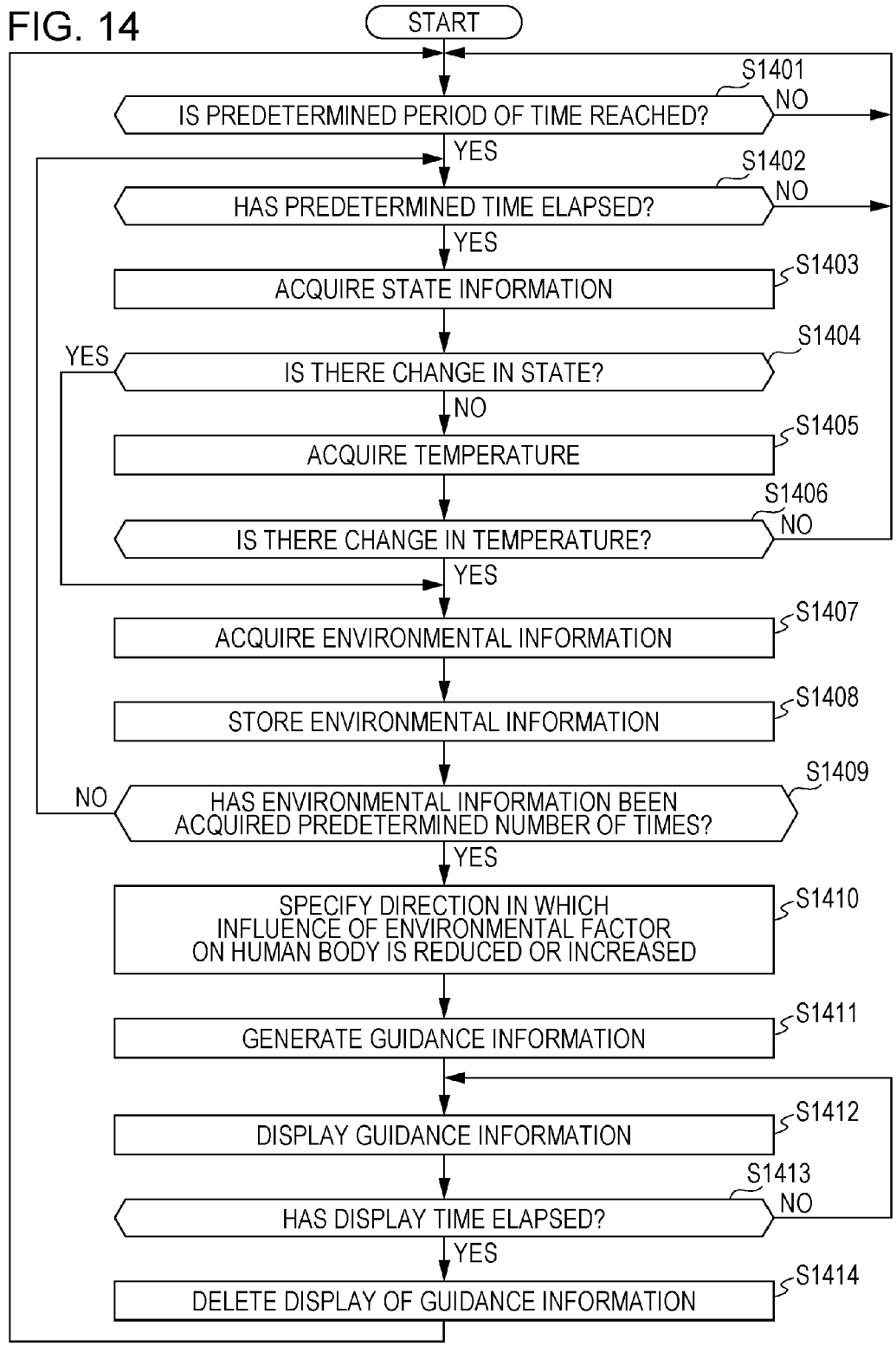
FIG. 14 is a flowchart showing processing procedures according to the fourth embodiment of the image display device.

FIG. 14 shows a flowchart showing processing procedures according to the fourth embodiment of the image display device 100.

The control unit 501 waits to start the process until a predetermined period of time is reached (No in Step S1401). The predetermined period of time mentioned herein is a period of time (or season) in which the influence of a target environmental factor on the human body is large. For example, when dealing with ultraviolet rays or photochemical smog as an environmental factor, the period of time corresponds to a period of time such as noon during which the sunlight is strong or evening during which the sunlight of the setting sun is strong. Until the predetermined period of time is reached, the control unit 501 or the image display device 100 may be switched to a sleep mode to achieve low power consumption.

Every time a predetermined time has elapsed (Yes in Step S1402) within the predetermined period of time (Yes in Step S1401), the state information acquisition unit 504 acquires state information related to a position and a posture of the image display device 100 or the user on which the image display device 100 is mounted (Step S1403), and checks whether there is a change in the position or posture from those of the previous time (Step S1404). When Step S1403 is initially executed (that is, when there is no information of the position and the posture of the previous time), it is regarded that a change is detected (that is, Yes in Step S1404).

When no change is detected in the position or posture of the image display device 100 or the user on which the image display device 100 is mounted (No in Step S1404), the state information acquisition unit 504 acquires a temperature (air temperature) of a location in which the image display device 100 or the user on which the image display device 100 is mounted is placed (Step S1405), and further checks whether there is a change in the temperature (Step S1406). Here, when no change is detected in the position or posture of the image display device 100 or the user on which the image display device 100 is mounted and there is also no change in the temperature (No in Step S1406), the process returns to Step S1401 and waits until a predetermined time elapses next time within the predetermined period of time.

When a change is detected in the position or posture of the image display device 100 or the user on which the image display device 100 is mounted (Yes in Step S1404), the environmental information acquisition unit 516 acquires environmental information such as a dose of exposure to the ultraviolet rays of the image display device 100 or the user on which the image display device 100 is mounted (Step S1407).

Since it is assumed that even when there is no change in the position or posture of the image display device 100 or the user on which the image display device 100 is mounted (No in Step S1404), when a change is detected in the temperature (Yes in Step S1406), the influence of the environmental factor is also changed due to the change in the temperature, the environmental information acquisition unit 516 acquires environmental information (Step S1407).

Next, when the environmental information is processed, the control unit 501 stores the information in the storage unit 506 or the like in association with the temperature and the state information related to the position and the posture (Step S1408).

It is checked whether the environmental information has been acquired a preset number of times within a predetermined time (Step S1409). When the environmental information has not been acquired a preset number of times (No in Step S1409), the process returns to Step S1402 to continuously acquire the environmental information within the predetermined time.

When the environmental information has been acquired a preset number of times within the predetermined period of time (Yes in Step S1409), that is, when a predetermined number of pieces of environmental information that are different in terms of the position or posture can be acquired, the control unit 501 analyzes the information acquired until that time to take a strength distribution of the environmental factor in the surrounding environment of the image display device 100 or the user on which the image display device 100 is mounted. Based on the strength distribution of the environmental factor within the predetermined time, the control unit 501 calculates a direction in which the environmental factor is reduced in the case of the environmental factor having an adverse influence on the human body, or calculates a direction in which the environmental factor is increased in the case of the environmental factor having a good influence on the human body (Step S1410). For example, a direction in which the influence of ultraviolet rays or photochemical smog on the user is increased in a period of time such as noon during which the sunlight is strong or evening during which the sunlight of the setting sun is strong is calculated.

Next, when guidance information for guiding the user so that the influence of the environmental factor on the user is reduced or increased is generated within the predetermined period of time based on the calculated direction (Step S1411), the control unit 501 displays the guidance information as, for example, a sub-screen (see FIG. 7) on the display unit 509 (Step S1412). The guidance information may include information related to the period of time in which the guidance is conducted. The guidance information may also be displayed on the external display unit 515.

When the display of the guidance information is conducted for a predetermined display time and terminated (Yes in Step S1413), the display of the guidance information is deleted from the screen of the display unit 509 (Step S1414), and then the process returns to Step S1401 to repeatedly execute the above-described process within the predetermined period of time.

According to the fourth embodiment, the image display device 100 can provide, in a timely manner, guidance information for guiding the user so that the influence of the environmental factor on the user is reduced or increased, by acquiring information related to the environmental factor in real time particularly in a period of time (or season) in which the influence of the environmental factor on the human body is large.

In addition, since the guidance information is displayed in a superimposed manner on the visual field of the user in a particularly important period of time, the user can rapidly take an appropriate action to reduce or increase the influence of the environmental factor. The user does not receive guidance information having less effect in an unnecessary period of time.

Fifth Embodiment

In the above-described first to fourth embodiments, the image display device 100 generates guidance information for guiding the user so that the influence of the environmental factor on the user is reduced or increased based on environmental information acquired in real time, and provides the guidance information to the user.

In a fifth embodiment, without acquiring environmental information in real time, the image display device 100 generates and provides guidance information based on environmental information acquired in the past. That is, the image display device 100 acquires a large number of pieces of environmental information in various states (position, posture, temperature, and period of time) of the image display device 100 or the user on which the image display device 100 is mounted, and previously stores the pieces of environmental information in the storage unit 506 or the like. When reading, a predetermined number of times, environmental information acquired in the past in a state identical to (or similar to) a current state, the image display device 100 calculates a direction in which the influence of the environmental factor on the user is reduced, or calculates a direction in which the influence of the environmental factor on the user is increased based on the read information. In addition, guidance information for guiding the user so that the influence of the environmental factor on the user is reduced or increased is generated and displayed as, for example, a sub-screen (see FIG. 7) on the display unit 509.

Figure 15:
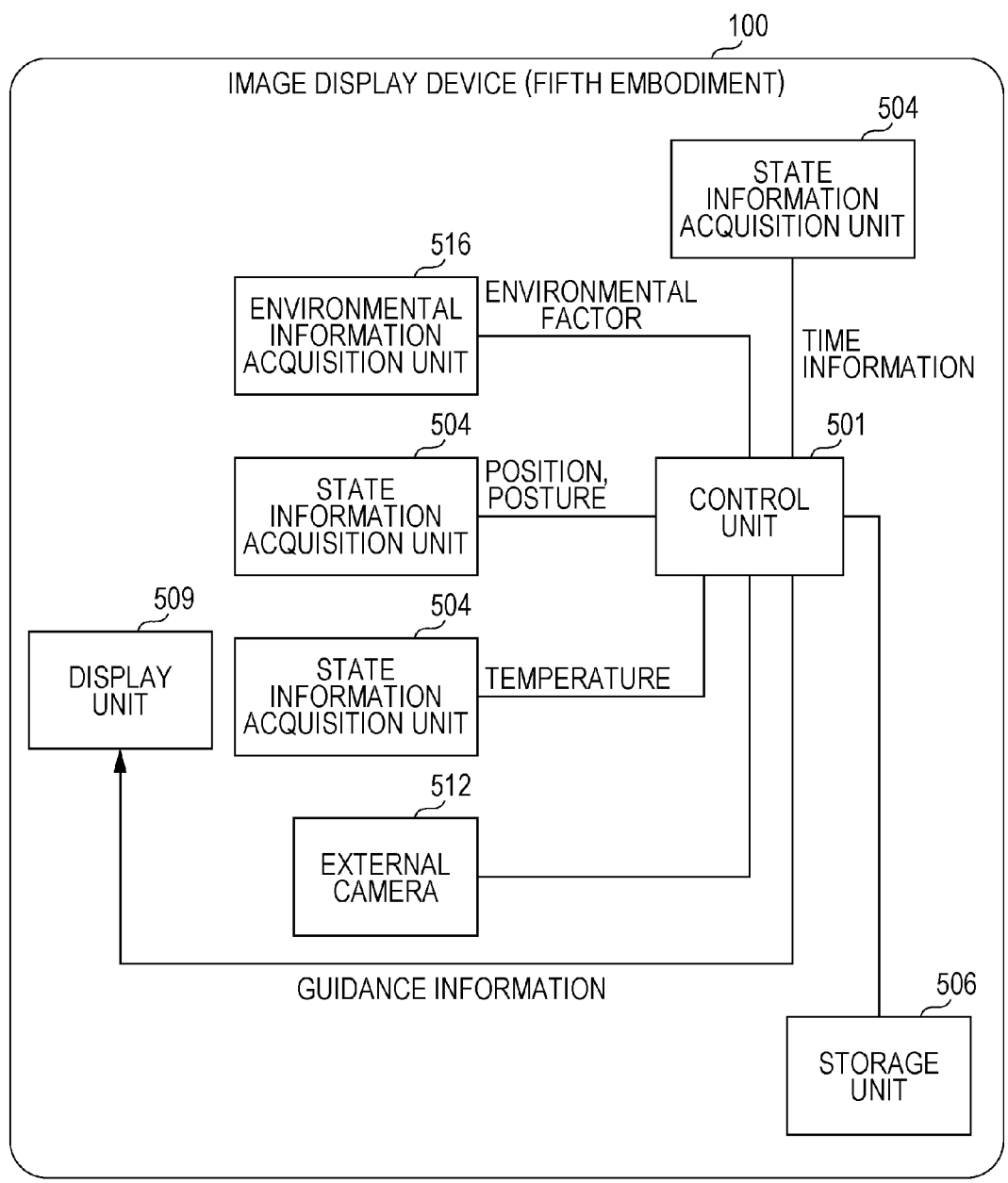
FIG. 15 is a diagram schematically showing a functional configuration according to a fifth embodiment of the image display device.

FIG. 15 schematically shows a functional configuration according to the fifth embodiment of the image display device 100.

The state information acquisition unit 504 acquires information of a current position and a current posture as a current state of the image display device 100 or the user on which the image display device 100 is mounted, and outputs the information to the control unit 501.

In addition, the state information acquisition unit 504 acquires a temperature (air temperature) of a location in which the image display device 100 or the user on which the image display device 100 is mounted is placed, and outputs the temperature to the control unit 501.

In addition, the state information acquisition unit 504 acquires information of a current time, and outputs the information to the control unit 501.

The external camera 512 captures a surrounding image of the image display device 100, and outputs the image to the control unit 501. For example, the external camera 512 is controlled in pan, tilt, and posture in a roll direction in accordance with a user's line-of-sight direction detected by the state information acquisition unit 504, and thus an image in the user's own line-of-sight direction, that is, an image in the user's line-of-sight direction can be captured by the external camera 512.

The environmental information acquisition unit 516 acquires information of an environmental factor such as electromagnetic waves (such as ultraviolet rays, blue light, and radio waves), heat rays (infrared rays), radiation, carbon monoxide, carbon dioxide, oxygen, nitrogen compounds (nicotine), nitrogen oxide, hydrocarbons, particulate matter, photochemical smog, pollen, house dust, and negative ions to which the image display device 100 or the user on which the image display device 100 is mounted is exposed currently, and outputs the information to the control unit 501.

The storage unit 506 stores information of the environmental factor acquired in the past in association with a state at the time of acquisition (for example, a position or a posture of the image display device 100 or the user on which the image display device 100 is mounted, a temperature, a period of time, and a surrounding image).

When reading, a predetermined number of times, environmental information acquired in the past in a state identical to (or similar to) a current state, the control unit 501 takes a strength distribution of the environmental factor in the surrounding environment of the image display device 100 or the user on which the image display device 100 is mounted, based on the read information. Next, based on the analysis result, the control unit 501 calculates a direction in which the influence of the environmental factor on the user is reduced, or calculates a direction in which the influence of the environmental factor on the user is increased, to generate guidance information for guiding the user so that the influence of the environmental factor on the user is reduced or increased. For example, in the case of an environmental factor having an adverse influence on the health of the human body, guidance information for guiding the user into a state for reducing the influence of the environmental factor is generated, but in the case of an environmental factor having a good influence on the health of the human body, guidance information for guiding the user into a state for increasing the influence of the environmental factor is generated.

The control unit 501 displays the generated guidance information on the screen of the display unit 509. The control unit 501 may output the guidance information as a voice from the voice input/output unit 514 in place of or with the display on the screen. The control unit 501 may also display the guidance information on the external display unit 515 to share the guidance information with other users in the surroundings.

Figure 16:
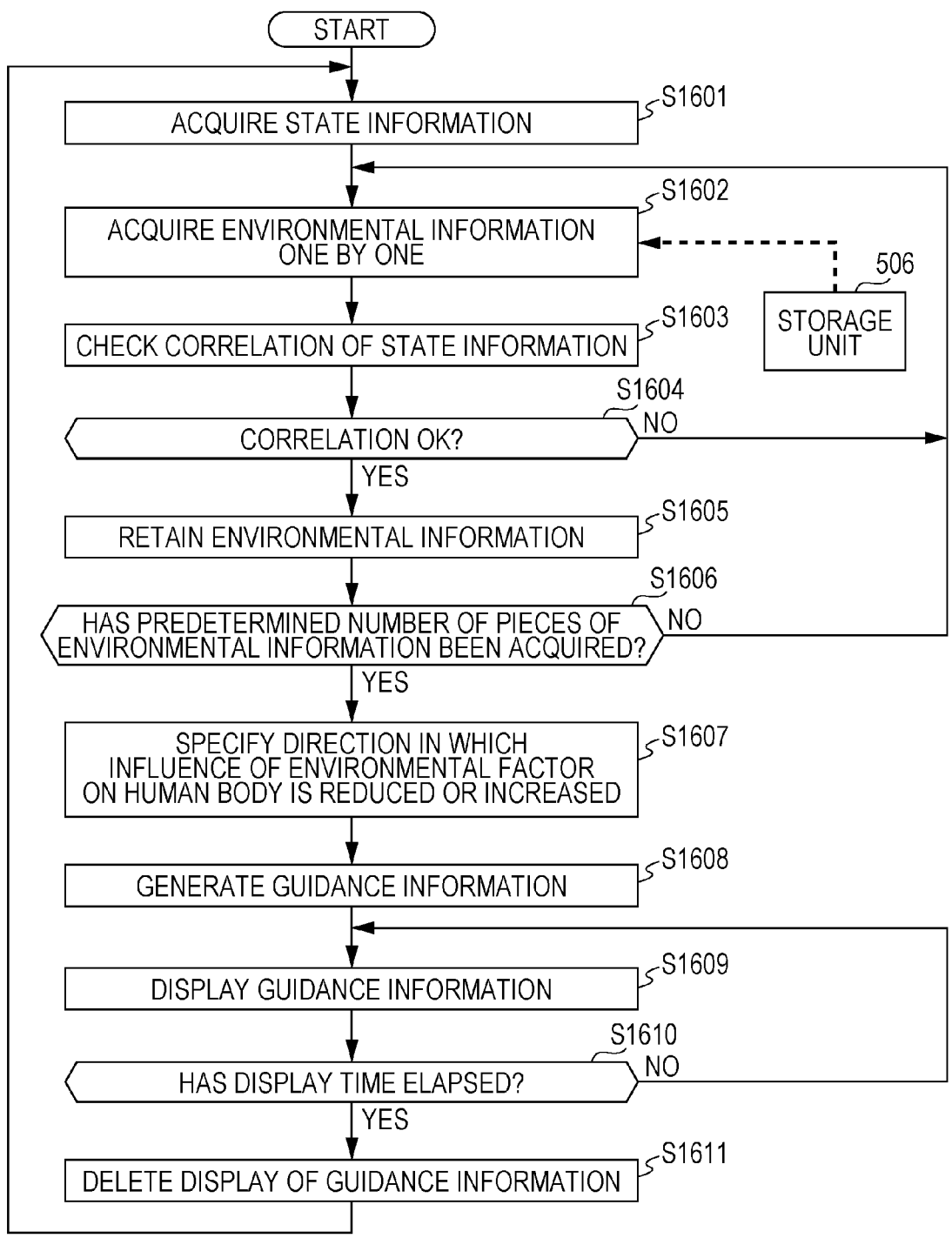
FIG. 16 is a flowchart showing processing procedures according to the fifth embodiment of the image display device.

FIG. 16 shows a flowchart showing processing procedures according to the fifth embodiment of the image display device 100. The processing procedures shown in FIG. 16 are started in response to, for example, a request for providing guidance information from the user.

First, the control unit 501 acquires information related to a current state of the image display device 100 or the user on which the image display device 100 is mounted (Step S1601). The information related to the state mentioned herein includes one or a combination of two or more of a position and a posture of the image display device 100 or the user on which the image display device 100 is mounted, a temperature (air temperature), and time information (current time) that are acquired by the state information acquisition unit 504, and a surrounding image captured by the external camera 512.

The control unit 501 reads the environmental information stored in the storage unit 506 one by one (Step S1602) and checks a correlation between the state corresponding thereto and the current state acquired in Step S1601 (Step S1603). A process of storing the environmental information having a high correlation with the current state (Yes in Step S1604, S1605) is repeatedly executed until a predetermined number of pieces of environmental information are stored (No in Step S1606).

When a predetermined number of pieces of environmental information are stored (Yes in Step S1606), the control unit 501 analyzes the predetermined number of pieces of environmental information to take a strength distribution of the environmental factor in the surrounding environment of the image display device 100 or the user on which the image display device 100 is mounted. Based on the strength distribution of the environmental factor, the control unit 501 calculates a direction in which the environmental factor is reduced in the case of the environmental factor having an adverse influence on the human body, or calculates a direction in which the environmental factor is increased in the case of the environmental factor having a good influence on the human body (Step S1607).

Next, when guidance information for guiding the user so that the influence of the environmental factor on the user is reduced or increased is generated within a predetermined period of time based on the calculated direction (Step S1608), the control unit 501 displays the guidance information as, for example, a sub-screen (see FIG. 7) on the display unit 509 (Step S1609). The guidance information may include information showing what state the environmental factor, on which the guidance information is based, is acquired in. The guidance information may also be displayed on the external display unit 515.

When the display of the guidance information is conducted for a predetermined display time and terminated (Yes in Step S1610), the display of the guidance information is deleted from the screen of the display unit 509 (Step S1611), and then the process returns to Step S1601 to repeatedly execute the above-described process within the predetermined period of time.

Sixth Embodiment

In the above-described first to fifth embodiments, it is assumed that one image display device 100 gathers the environmental information independently. Therefore, when the user on which the image display device 100 is mounted faces an unprecedented situation such as one where the user is placed in a location where the user visits for the first time, guidance information may not be rapidly provided, and thus it is necessary to execute a process of acquiring environmental information a predetermined number of times in a current state to calculate a direction in which the influence of an environmental factor on the user is reduced or increased to thus provide guidance information.

In a sixth embodiment, the image display device 100 gathers environmental information having a correlation with a current state of the image display device 100 through the communication unit 505 or the like from outside. Accordingly, even in a location where environmental information may not be sufficiently acquired independently, such as a location where the user on which the image display device 100 is mounted visits for the first time, guidance information can be rapidly provided by acquiring a predetermined number of pieces of environmental information through a network or the like.

Figure 17:
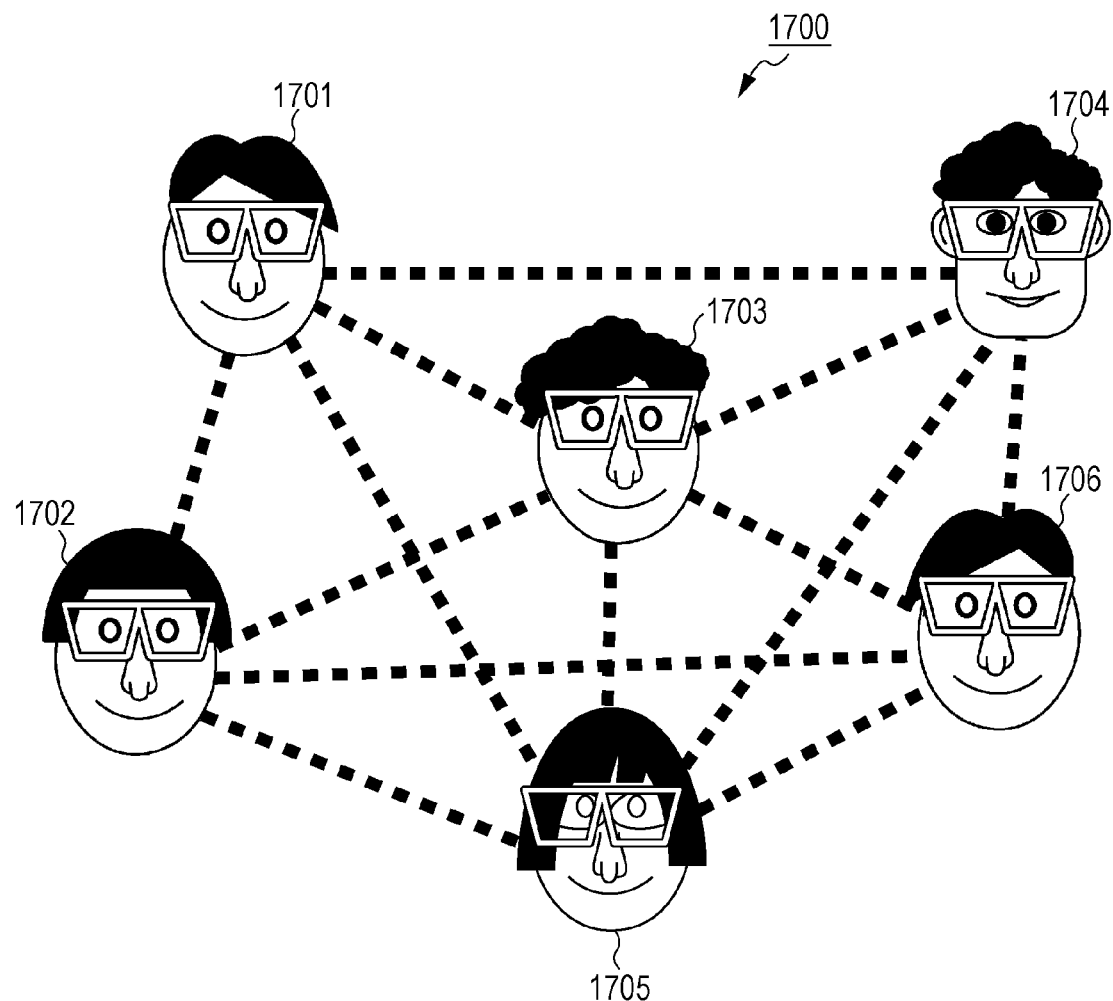
FIG. 17 is a diagram schematically showing a configuration of a communication system formed of a plurality of image display devices.

FIG. 17 schematically shows a configuration of a communication system 1700 formed of a plurality of image display devices. The respective image display devices 1701, 1702, . . . basically have the configuration shown in FIG. 5, and each of them is a head-mounted display that is mounted and used on a user's head or face.

The communication system 1700 is, for example, a mesh network specified by IEEE802.11s. Each of the image display devices 1701, 1702, . . . corresponds to a node and is connected to each other in a point-to-point manner (expressed by the dotted lines in FIG. 17) to exchange or share environmental information acquired by the respective image display devices 1701, 1702, . . . . At this time, the image display devices 1701, 1702, . . . may be attached with information related to a state such as position or posture information. In addition, each of the image display devices 1701, 1702, . . . may be provided with one or more antennas to mechanically or electrically change the directivity thereof so that a communication partner can estimate an arrival direction or a position.

Figure 18:
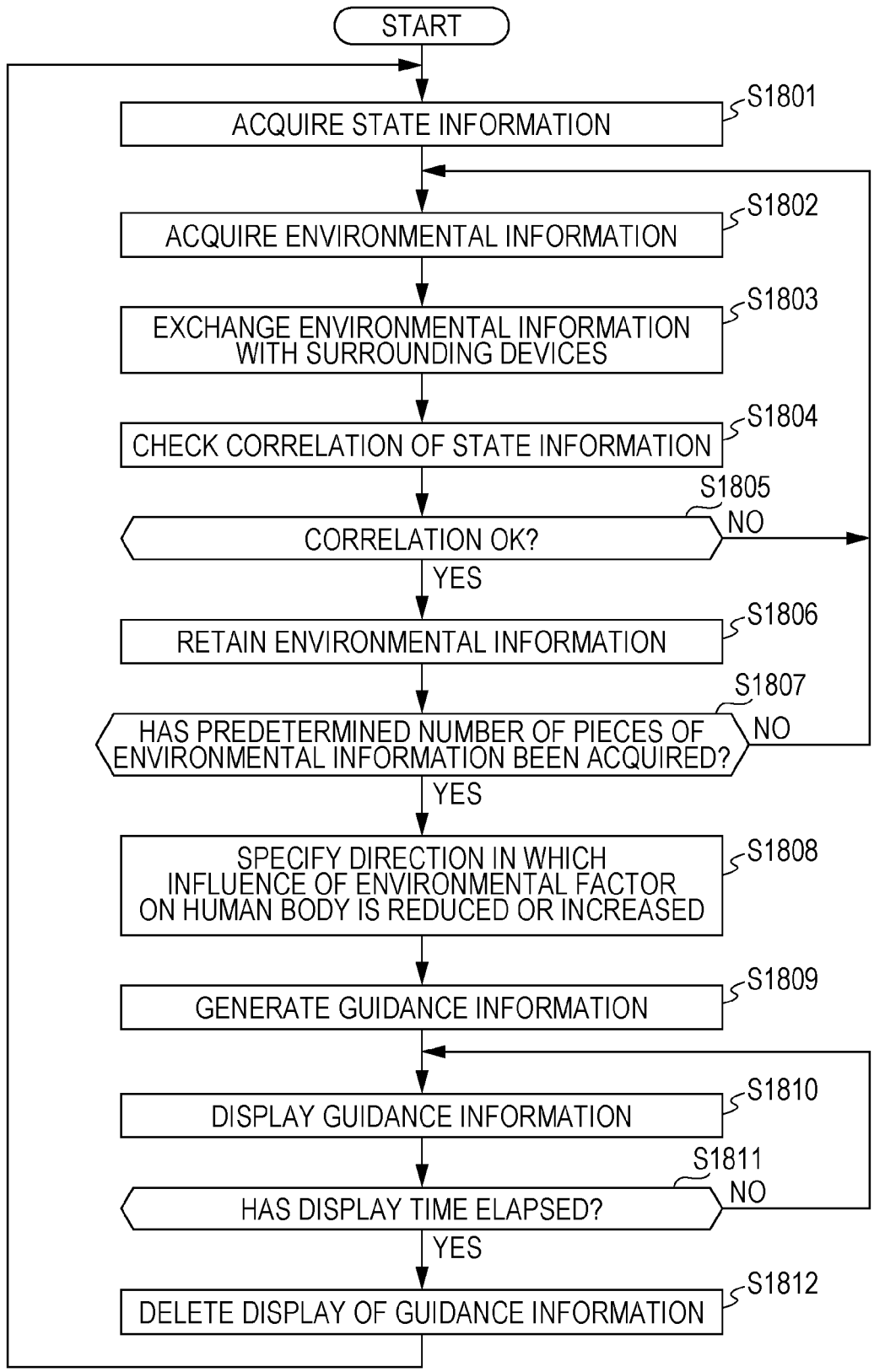
FIG. 18 is a flowchart showing processing procedures that are performed by the image display devices in the communication system shown in FIG. 17.

FIG. 18 shows a flowchart showing processing procedures that are performed by the image display devices 1701, 1702, . . . in the communication system 1700 shown in FIG. 17.

First, the image display device acquires a current state such as a position or a posture of the image display device or the user on which the image display device is mounted (Step S1801), and acquires environmental information (Step S1802). The acquired environmental information is stored in association with the state information acquired in Step S1801.

The image display device is sequentially connected to image display devices that are present within a communicable range of the image display device in a point-to-point manner, for example, to exchange the environmental information associated with the state information (Step S1803). At this time, as along with the information acquired in real time in Steps S1801 and S1802, information stored in the past may also be exchanged in combination.

The image display device checks a correlation between the state associated with the received environmental information and the current state acquired in Step S1801 (Step S1804). A process of storing the environmental information having a high correlation with the current state of the image display device (Yes in Step S1805, S1806) is repeatedly executed until a predetermined number of pieces of environmental information are stored (No in Step S1807).

When a predetermined number of pieces of environmental information are stored (Yes in Step S1807), the image display device analyzes the predetermined number of pieces of environmental information to take a strength distribution of the environmental factor in the surrounding environment of the image display device or the user on which the image display device is mounted. Based on the strength distribution of the environmental factor, a direction in which the environmental factor is reduced is calculated in the case of the environmental factor having an adverse influence on the human body, or a direction in which the environmental factor is increased is calculated in the case of the environmental factor having a good influence on the human body (Step S1808).

Next, when guidance information for guiding the user so that the influence of the environmental factor on the user is reduced or increased is generated within a predetermined period of time based on the calculated direction (Step S1809), the image display device displays the guidance information as, for example, a sub-screen (see FIG. 7) on the display unit 509 (Step S1810). The guidance information may also be displayed on the external display unit 515.

When the display of the guidance information is conducted for a predetermined display time and terminated (Yes in Step S1811), the image display device deletes the display of the guidance information from the screen of the display unit 509 (Step S1812), and then returns the process to Step S1801 to repeatedly execute the above-described process within the predetermined period of time.

Figure 19:
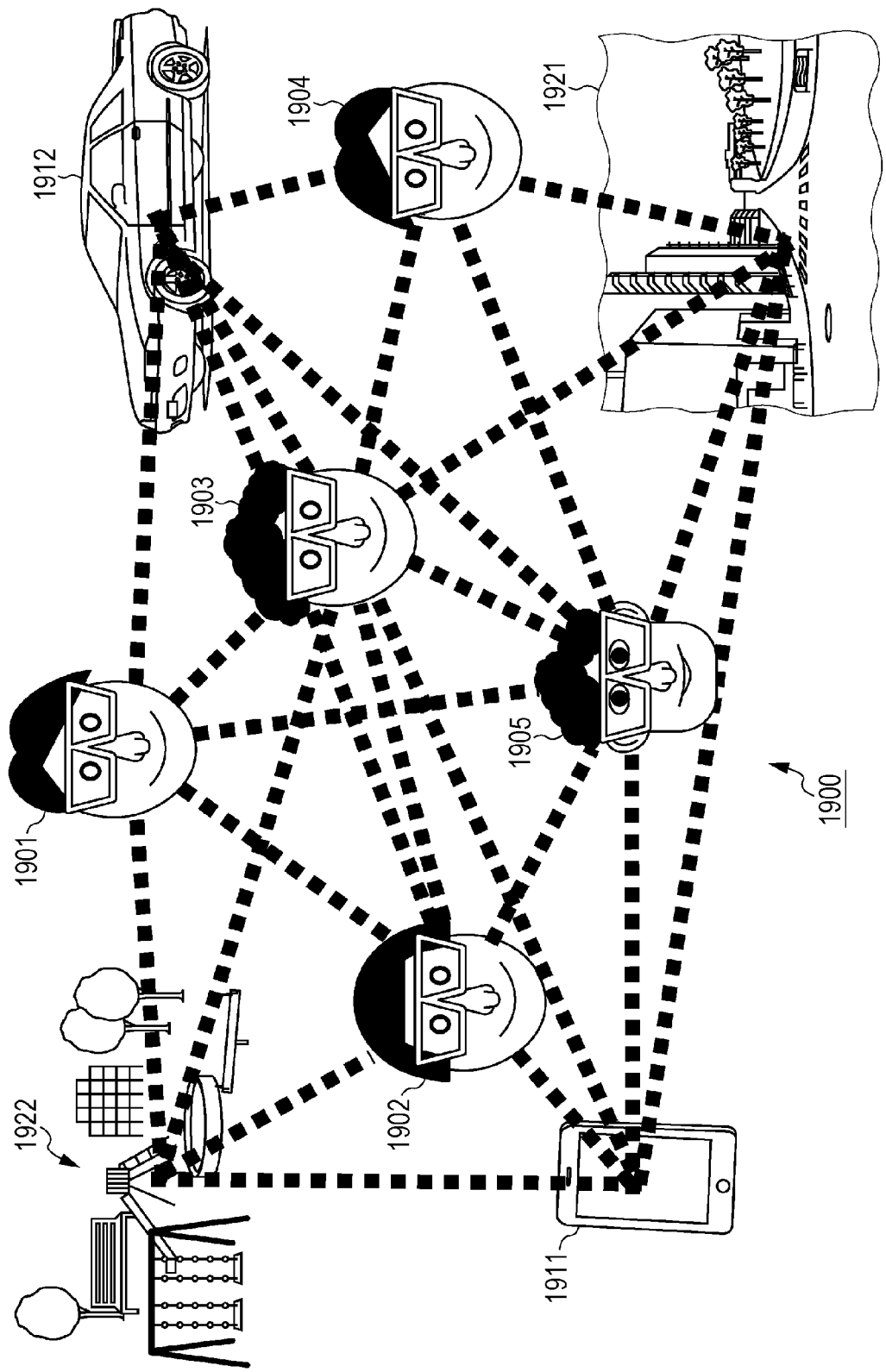
FIG. 19 is a diagram schematically showing a configuration of a communication system according to a modification example of FIG. 17.

FIG. 19 schematically shows a configuration of a communication system 1900 according to a modification example of FIG. 17. The communication system 1900 shown in FIG. 19 is configured as a mesh network as in the case of the above-described communication system 1700. In the communication system 1700 shown in FIG. 17, only the image display devices 1701, 1702, . . . are nodes. However, in the communication system 1900 shown in FIG. 19, in addition to image display devices 1901, 1902, . . . , nodes are installed in mobile devices such as a multifunctional information terminal 1911 such as a smart phone of a certain user and a vehicle 1912, and nodes are fixed to specific locations such as a street corner 1921 and a park 1922. In either case, the image display devices 1901, 1902, . . . serving as nodes can provide, to the user, guidance information for conducting guidance so that the influence of an environmental factor on the user is reduced or increased according to the processing procedures shown in FIG. 18.

Seventh Embodiment

In the sixth embodiment, the image display device 100 acquires environmental information from an external device through the point-to-point communication using the mesh network even in a location where environmental information having a correlation of a current state of the image display device 100 may not be sufficiently acquired independently. In this case, it is possible to rapidly gather a predetermined number of pieces of necessary environmental information even in a location where the user on which the image display device 100 is mounted visits for the first time. However, the image display device 100 can gather the environmental information only within a communicable range. In addition, since it is necessary to have sequential connection to the nodes within the communicable range in a point-to-point manner to acquire the predetermined number of pieces of environmental information, communication load is large.

Figure 20:
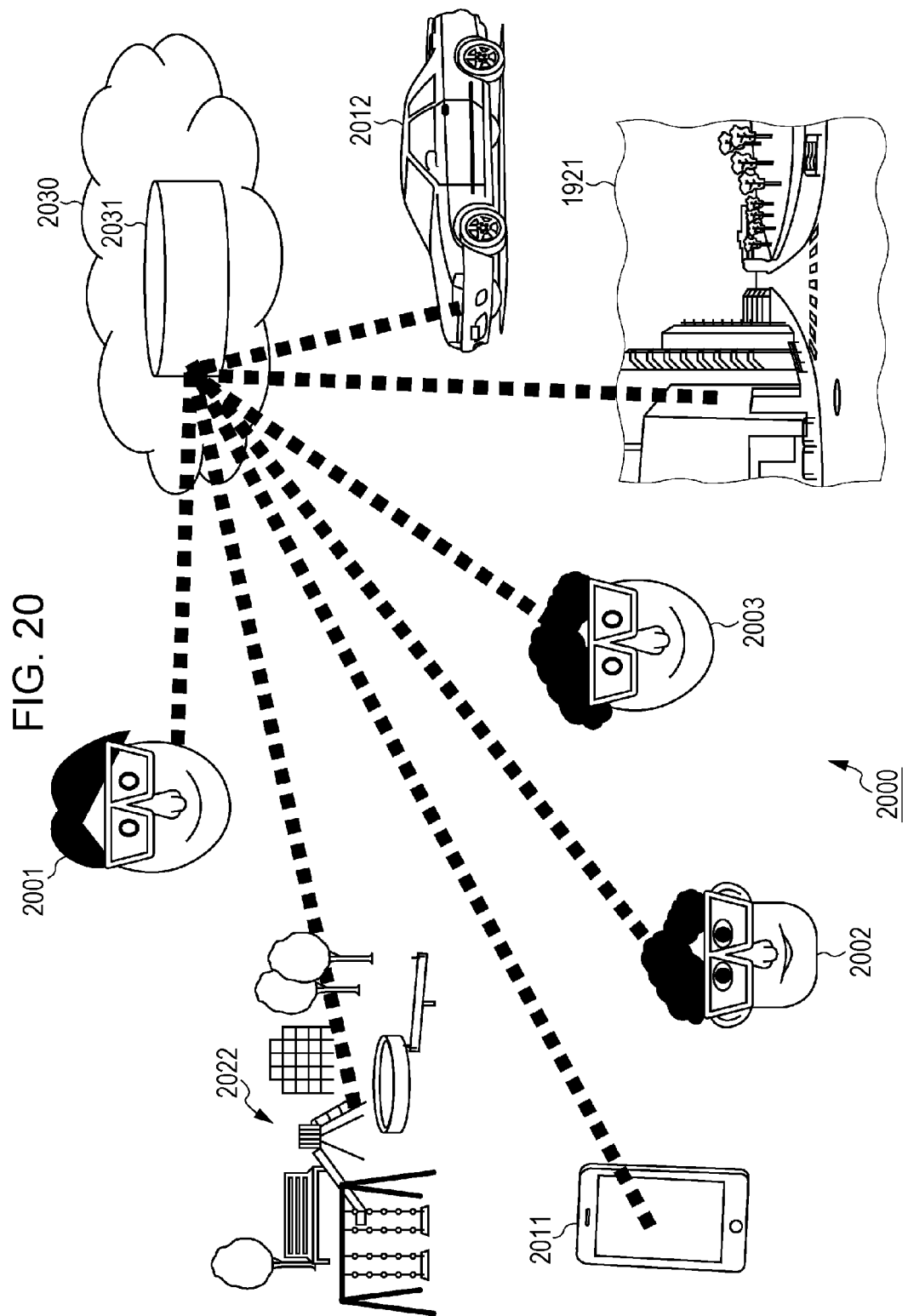
FIG. 20 is a diagram schematically showing a configuration of a communication system according to a seventh embodiment.

However, in a seventh embodiment, as shown in FIG. 20, a configuration is used in which environmental information acquired by image display devices 2001, 2002, . . . , nodes installed in mobile devices such as a multifunctional information terminal 2011 such as a smart phone of a certain user and a vehicle 2012, and nodes fixed to public locations such as a street corner 2021 and a park 2022 is uniformly managed on a server 2031 installed on, for example, a cloud 2030.

The server 2031 provides the gathered environmental information to the nodes including the image display devices 2001, 2002, . . . . Accordingly, the nodes 2001, 2002, . . . upload the environmental information acquired by the nodes 2001, 2002, . . . onto the server 2031 to share the environmental information between the nodes 2001, 2002, . . . .

In addition, when gathering the environmental information from the nodes 2001, 2002, . . . , the server 2031 acquires state information such as a position and a posture at the time of measuring an environmental factor such as ultraviolet rays and electromagnetic waves, a time or a period of time, a temperature, and climate in combination, and manages the environmental information in association with the state information in the database. In such a case, the nodes 2001, 2002, . . . can rapidly acquire a predetermined number of pieces of environmental information necessary for generating guidance information from the server 2030 by referring to the server 2031 for current state information. In addition, each of the nodes 2001, 2002, . . . can acquire environmental information of a location outside a communicable range of each node through the server 2031. In addition, since it may not be necessary to have sequential connection to other nodes in a point-to-point manner, communication load is reduced.

FIG. 21 shows a flowchart showing processing procedures that are performed by the image display devices 2001, 2002, . . . in the communication system 2000 shown in FIG. 20. The processing procedures shown in FIG. 21 are based on the fact that the environmental information acquired by the nodes including the image display devices 2001, 2002, . . . is uploaded onto the server 2031.

When a current state such as a position or a posture of the image display device or the user on which the image display device is mounted, a time, a temperature, and climate is acquired (Step S2101), the image display device refers to the server 2031 based on this state information (Step S2102). The image display device can acquire a predetermined number of pieces of environmental information corresponding to the current state information that are provided from the server 2031 (Step S2103).

Next, the image display devices analyzes the predetermined number of pieces of environmental information to take a strength distribution of the environmental factor in the surrounding environment of the image display device or the user on which the image display device is mounted. Based on the strength distribution of the environmental factor, a direction in which the environmental factor is reduced is calculated in the case of the environmental factor having an adverse influence on the human body, or a direction in which the environmental factor is increased is calculated in the case of the environmental factor having a good influence on the human body (Step S2104).

Next, when guidance information for guiding the user so that the influence of the environmental factor on the user is reduced or increased is generated within a predetermined period of time based on the calculated direction (Step S2105), the image display device displays the guidance information as, for example, a sub-screen (see FIG. 7) on the display unit 509 (Step S2106). The guidance information may also be displayed on the external display unit 515.

When the display of the guidance information is conducted for a predetermined display time and terminated (Yes in Step S2107), the image display device deletes the display of the guidance information from the screen of the display unit 509 (Step S2108), and then returns the process to Step S2101 to repeatedly execute the above-described process within the predetermined period of time.

In the seventh embodiment, by utilizing the server 2031, the image display device can rapidly acquire necessary environmental information with low communication load when providing guidance information to the user.

Eighth Embodiment

In the above-described first to seventh embodiments, guidance information at a single point that is identical or similar in terms of the state is provided to the user. In such a case, guidance information for conducting guidance so that the influence of the environmental factor on the user is reduced or increased is provided for each point on the route to the user who is moving from a certain start point to a goal point. Therefore, it is assumed that although the user can take such an action that the influence of the environmental factor is reduced or increased at each point on the route (for example, the user moves in such a direction as to escape the environmental factor or to be exposed to the environmental factor), the user may deviate from the route or may walk in the opposite direction on the route as a result of such an action. That is, the action according to the guidance information providing the environmental information for each point may be incompatible with the movement.

However, in an eighth embodiment, environmental information acquired at a plurality of points is mapped in two dimensions on a map or the like to provide guidance information for guiding the user so that the influence of the environmental factor is reduced or increased on the route. Accordingly, with reference to the guidance information mapped in two dimensions, the user can decide the next movement direction or movement point so that the influence of the environmental factor is reduced or increased in consideration of heading for the goal point.

For example, when providing guidance information related to an environmental factor, such as ultraviolet rays, that is largely influenced by a measurement time or climate, it is preferable to generate guidance information by mapping environmental information associated with state information that is identical or similar to a current time and current climate on a two-dimensional plane such as a map.

In addition, in the case in which when guidance information is generated, a start point and a goal point of the user are provided, when guidance information formed of a two-dimensional plane such as a map with such a scale that the start point and the goal point are included (or the route is not interrupted) is generated, it is easier to view for the user to view it.

A method of generating, from environmental information obtained from a single user, guidance information in which a strength distribution of an environmental factor is mapped on a two-dimensional plane such as a map, and a method of generating the guidance information based on environmental information obtained from two or more users are considered.

In the former method of generating guidance information from environmental information obtained from a single user, for example, as in the case of the above-described fifth embodiment, environmental information stored already in the past in the storage unit 506 is used. In this case, it is assumed that there is a point where environmental information that is identical or similar to state information such as a current time and current climate is not obtained on the route since the number of pieces of environmental information gathered is insufficient. Accordingly, for a point where corresponding environmental information is not obtained, it is preferable to perform an interpolation process using environmental information obtained already at a point around the foregoing point.

When generating guidance information that is mapped in two dimensions using environmental information measured in an observation station installed in one specific location, it is also assumed that there is a point where environmental information that is identical or similar to state information such as a current time and current climate is not obtained. Accordingly, it is preferable to perform an interpolation process as in the above description.

Figure 22A:
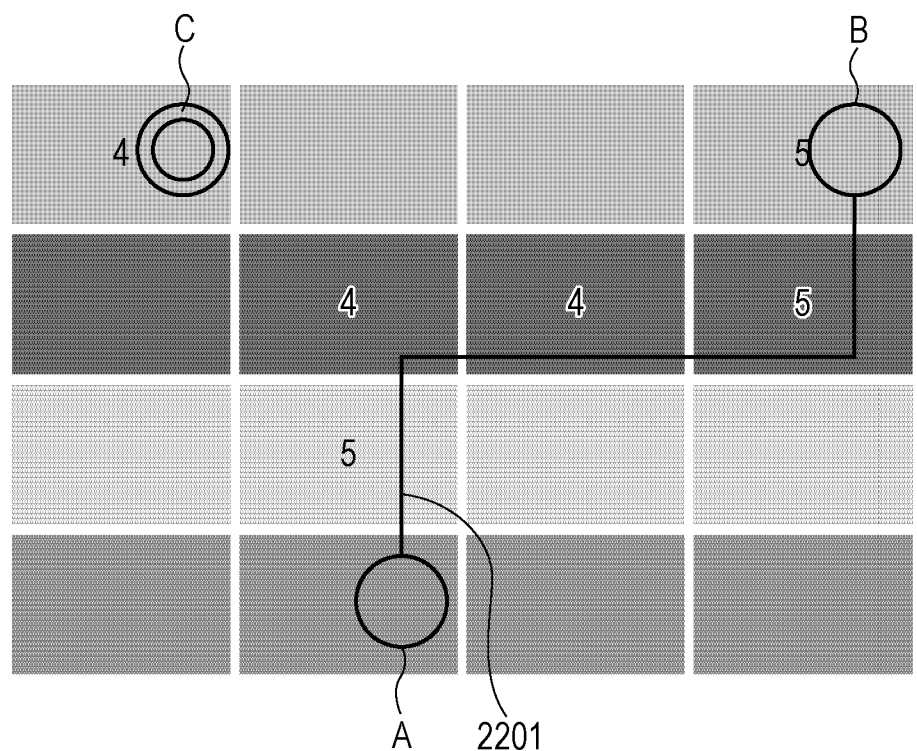
FIG. 22A is a diagram for illustrating a process of generating guidance information mapped on a two-dimensional plane by subjecting environmental information at respective points to an interpolation process.
Figure 22B:
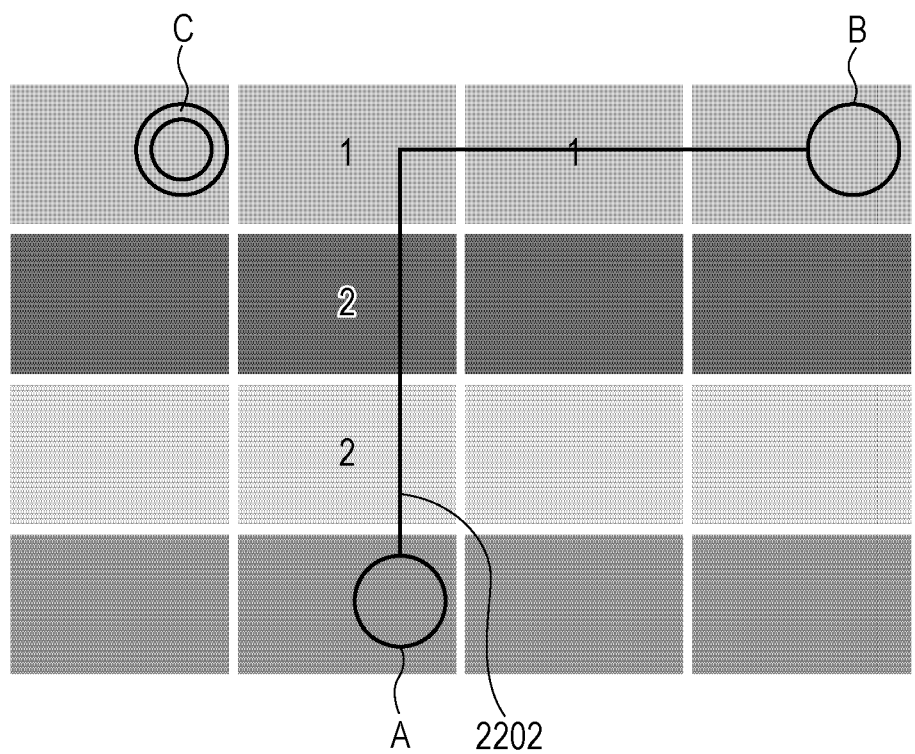
FIG. 22B is a diagram for illustrating a process of generating guidance information mapped on a two-dimensional plane by subjecting environmental information at respective points to an interpolation process.
Figure 22C:
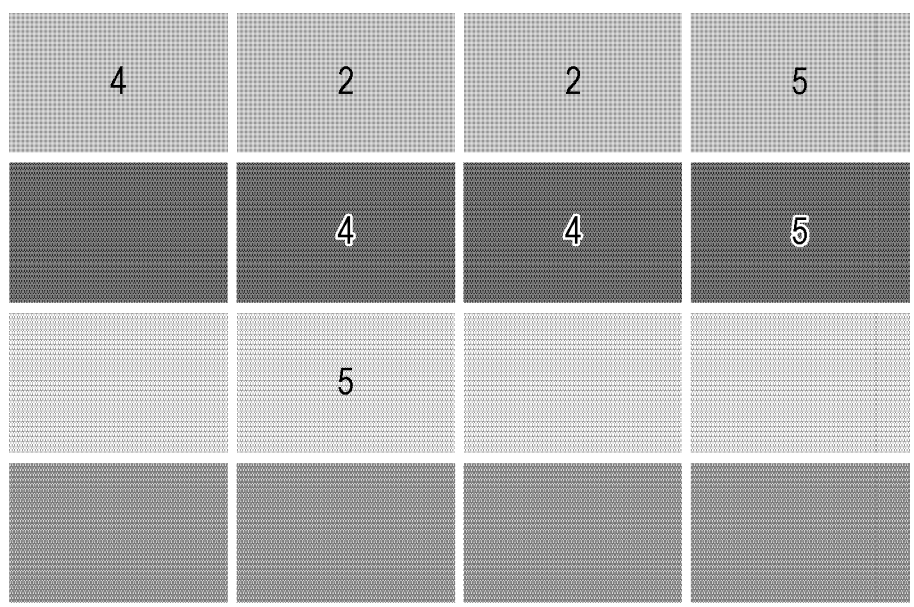
FIG. 22C is a diagram for illustrating a process of generating guidance information mapped on a two-dimensional plane by subjecting environmental information at respective points to an interpolation process.

FIGS. 22A to 22C illustrate the generation of guidance information mapped on a two-dimensional plane by subjecting environmental information at respective points to an interpolation process based on environmental information measured in a specific observation station.

FIG. 22A shows strengths of an environmental factor at respective points on a route represented by the reference number 2201, measured in an observation station C when the user moves from a start point A to a goal point B on the route 2201 on a sunny day. Here, ultraviolet rays are assumed as the environmental factor and an index value of the measurement result is displayed at a corresponding point.

FIG. 22B shows strengths of the environmental factor at respective points on a route represented by the reference number 2202, measured in the observation station C when the user moves from the start point A to the goal point B on the route 2202 on a cloudy day.

FIG. 22C shows mapping on a two-dimensional plane through interpolation of the strengths of the environmental factor at the respective points based on the results of the measurement in the observation station C shown in FIGS. 22A and 22B. A method of expressing the strengths of the environmental factor at the respective points with colors, gradations, or icons indicating strength levels, rather than with the index values as shown in FIGS. 22A to 22C, is considered.

In the latter method of generating guidance information based on environmental information obtained from a plurality of users, for example, as shown in FIGS. 17 and 19, environmental information is gathered from other users through point-to-point communication, or as shown in FIG. 20, environmental information of a plurality of users that is uniformly managed in a specific server is used. As in the above description, it is necessary to perform an interpolation process for a point where environmental information that is identical or similar to state information such as a current time and current climate is not obtained.

FIGS. 23A to 23D illustrate the generation of guidance information mapped on a two-dimensional plane based on environmental information from a plurality of other users. In the example shown in FIGS. 23A to 23D, for the sake of convenience of description, guidance information for the user is generated based on environmental information acquired from two other users P and Q.

Figure 23A:
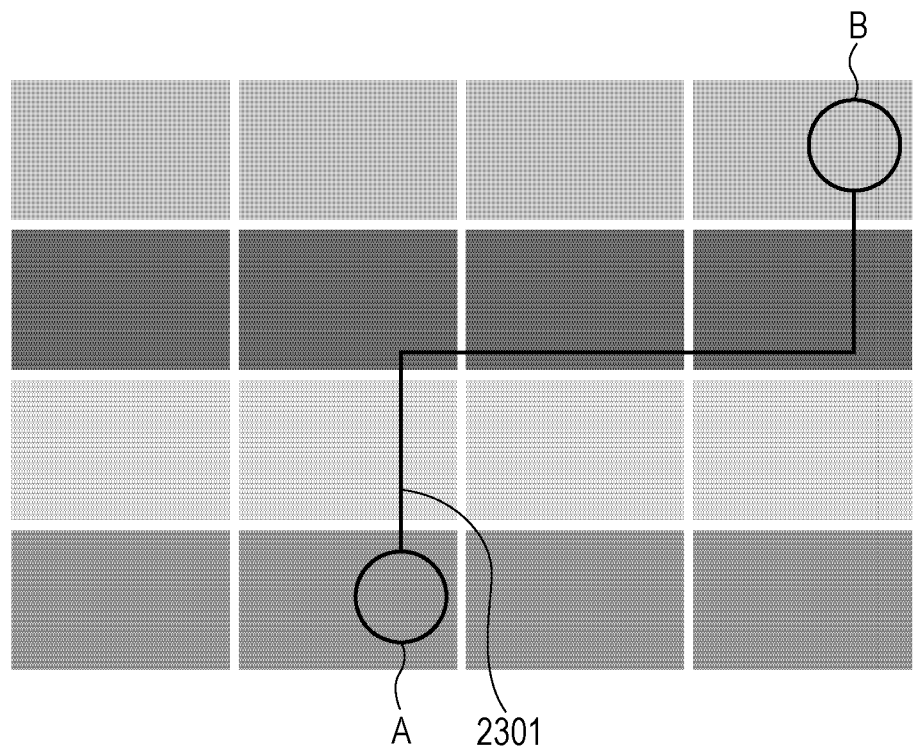
FIG. 23A is a diagram for illustrating a process of generating guidance information mapped on a two-dimensional plane based on environmental information from a plurality of users.

As shown in FIG. 23A, the user inputs a route 2301 scheduled from a start point A to a goal point to the image display device 100 mounted on the user through, for example, the input operation unit 502 or voice input.

The main body of the image display device 100 acquires environmental information acquired from other users as a reference value through, for example, the communication unit 505. For example, environmental information (see FIG. 23B) as a reference value is acquired from another user P having a route 2302 identical or similar to the scheduled route input from the user, or environmental information (see FIG. 23C) as a reference value is acquired from another user Q having a route (such as a route crossing the scheduled route) 2303 that is near the scheduled route of the user although not similar thereto.

Examples of the method of causing the image display device 100 to acquire the environmental information from other users P and Q include a method of acquiring information through point-to-point communication using a mesh network from image display devices that are mounted on other users P and Q and a method of downloading information from a server that manages environmental information uploaded from image display devices that are mounted on other users P and Q.

Figure 23B:
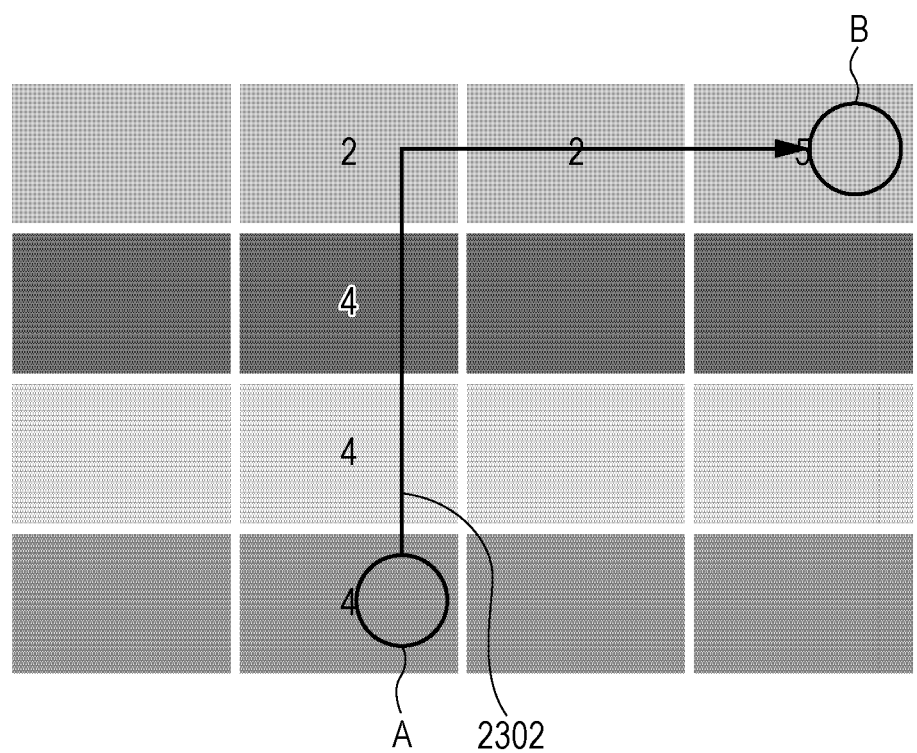
FIG. 23B is a diagram for illustrating a process of generating guidance information mapped on a two-dimensional plane based on environmental information from a plurality of users.
Figure 23C:
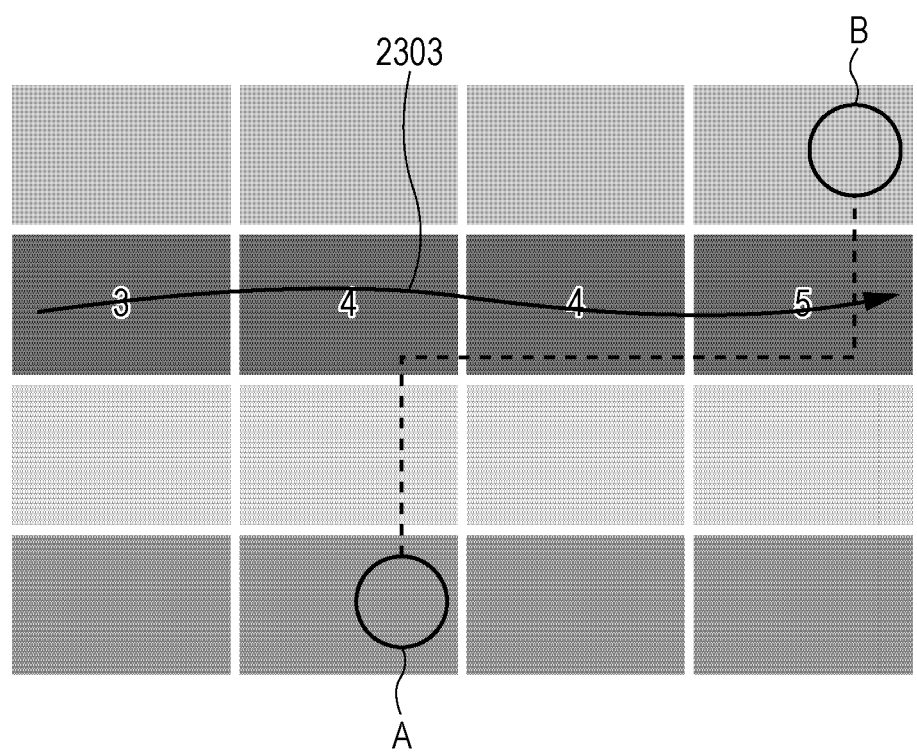
FIG. 23C is a diagram for illustrating a process of generating guidance information mapped on a two-dimensional plane based on environmental information from a plurality of users.
Figure 23D:
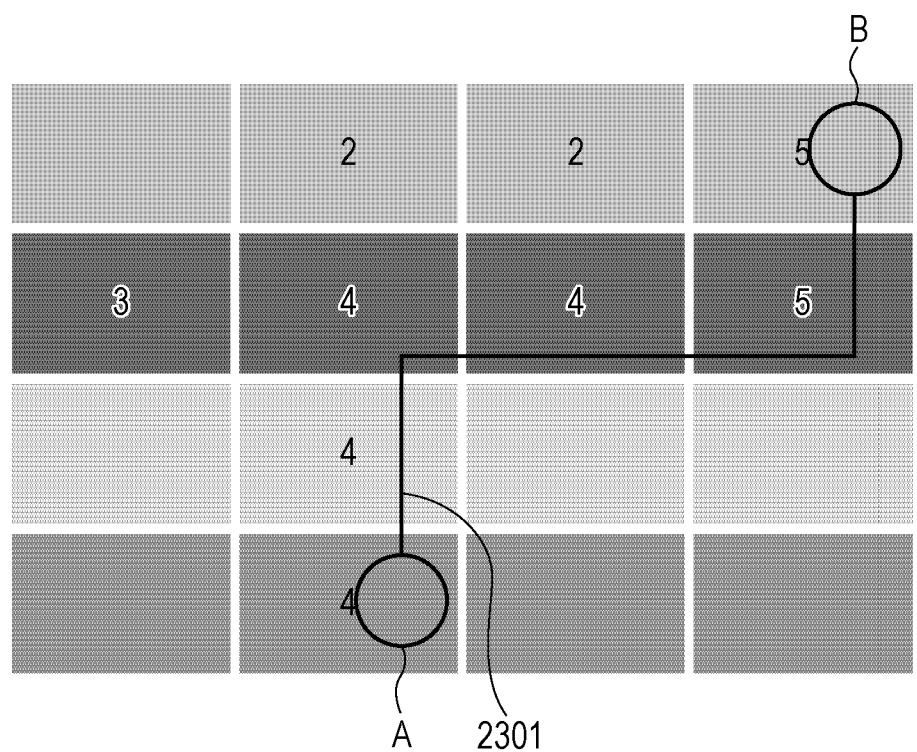
FIG. 23D is a diagram for illustrating a process of generating guidance information mapped on a two-dimensional plane based on environmental information from a plurality of users.

The image display device 100 performs mapping on a two-dimensional plane as shown in FIG. 23D by interpolating the strengths of the environmental factor at the respective points on the scheduled route 2301 of the user based on the environmental information shown in FIGS. 23B and 23C. A method of expressing the strengths of the environmental factor at the respective points with colors, gradations, or icons indicating strength levels, rather than with the index values as shown in FIGS. 23A to 23D, is considered.

According to the eighth embodiment, with reference to the guidance information mapped in two dimensions, the user can decide the next movement direction or movement point so that the influence of the environmental factor is reduced or increased in consideration of heading for the goal point.

Although the present technology has been described in the form of exemplification, the content disclosed in this specification should not be limitedly understood. In order to determine the gist of the present technology, claims should be referred to.

The present technology can also employ the following configurations:

(1) A head- or face-mounted image display device including an environmental information acquisition unit that acquires environmental information, a state information acquisition unit that acquires state information, a guidance information generation unit that generates guidance information for guidance into a state in which the influence of environment is reduced or increased based on at least one piece of environmental information acquired for each state, and a provision unit that provides the guidance information.

(2) The image display device according to (1), in which the environmental information acquisition unit acquires information related to at least one of environmental factors such as electromagnetic waves (such as ultraviolet rays, blue light, and radio waves), heat rays (infrared rays), radiation, carbon monoxide, carbon dioxide, oxygen, nitrogen oxide, nitrogen compounds (nicotine), hydrocarbons, particulate matter, photochemical smog, pollen, house dust, and negative ions to which a main body of the image display device or a user on which the image display device is mounted is exposed.

(3) The image display device according to (1), in which the guidance information generation unit generates guidance information for guidance into a state in which an environmental factor having an adverse influence on the image display device or a user on which the image display device is mounted is reduced, or guidance information for guidance into a state in which an environmental factor having a good influence on the image display device or the user on which the image display device is mounted is increased.

(4) The image display device according to (1), further including an image display unit that displays an image, in which the provision unit displays the guidance information on the image display unit.

(5) The image display device according to (4), in which the provision unit displays the guidance information on the image display unit in a superimposed manner on an image of a visual field of a user with the image display device mounted on a head or a face.

(6) The image display device according to (5), in which the provision unit displays, on the image display unit in a superimposed manner on the image of the visual field of the user, guidance information indicating a guidance direction in which the influence of environment is reduced or increased.

(7) The image display device according to (1), in which the state information acquisition unit acquires current state information of the image display device or a user on which the image display device is mounted, the environmental information acquisition unit acquires environmental information of the image display device or the user on which the image display device is mounted every time there is a change in the state information, and the guidance information generation unit generates guidance information based on the environmental information acquired for a predetermined time up to the current time.

(8) The image display device according to (1), in which the state information acquisition unit acquires state information related to a current position or posture of a main body of the image display device or a user on which the image display device is mounted, and the guidance information generation unit generates guidance information in the current position or posture, based on the environmental information acquired by the environmental information acquisition unit in a different position or posture.

(9) The image display device according to (1), in which the state information acquisition unit acquires state information related to a current position or posture of a main body of the image display device or a user on which the image display device is mounted and a temperature, and the guidance information generation unit generates guidance information in the current position or posture, based on the environmental information acquired by the environmental information acquisition unit in a different position or posture or at a different temperature.

(10) The image display device according to (1), in which the state information acquisition unit acquires current state information of the image display device or a user on which the image display device is mounted within a predetermined period of time, the environmental information acquisition unit acquires environmental information of the image display device or the user on which the image display device is mounted every time there is a change in the state information within the predetermined period of time, and the guidance information generation unit generates guidance information within the predetermined period of time based on the environmental information.

(11) The image display device according to (10) that stops at least a function in the image display device in a period of time other than the predetermined period of time.

(12) The image display device according to (10), in which the state information acquisition unit acquires state information related to a current position or posture of a main body of the image display device or the user on which the image display device is mounted and a temperature, and the guidance information generation unit generates guidance information in the current position or posture, based on the environmental information acquired by the environmental information acquisition unit in a different position or posture or at a different temperature within the predetermined period of time.

(13) The image display device according to (1), further including a storage unit that stores the environmental information acquired by the environmental information acquisition unit in association with state information at the time of acquisition, in which the guidance information generation unit generates guidance information based on the environmental information stored in the storage unit.

(14) The image display device according to (1), further including a communication unit that communicates with an external device that provides environmental information, in which the state information acquisition unit acquires environmental information from the external device through the communication unit, and the guidance information generation unit generates guidance information based on at least one piece of environmental information acquired through the communication unit.

(15) The image display device according to (14), in which the external device includes at least one of another image display device or an information terminal other than the image display device that is mounted on another user, an information terminal that is installed in a mobile device, an information terminal that is fixed to a specific location, and a server that holds environmental information acquired by a plurality of information terminals.

(16) The image display device according to (1), in which the guidance information generation unit generates guidance information by mapping environmental information on a two-dimensional plane including a route scheduled by a user on which the image display device is mounted.

(17) The image display device according to (16), further including a communication unit that communicates with an external device that provides environmental information, in which the state information acquisition unit acquires environmental information from the external device through the communication unit, and the guidance information generation unit generates guidance information in which environmental information at a plurality of points acquired through the communication unit is mapped in two dimensions.

(18) The image display device according to (16), in which the guidance information generation unit subjects environmental information of a point where environmental information may not be acquired on the route to an interpolation process.

(19) An image display method including acquiring environmental information, acquiring state information, generating guidance information for guidance into a state in which the influence of environment is reduced or increased based on at least one piece of environmental information acquired for each state, and providing the guidance information.

(20) A storage medium that stores a computer program that is provided in a computer-readable form to cause a computer to function as an environmental information acquisition unit that acquires environmental information, a state information acquisition unit that acquires state information, a guidance information generation unit that generates guidance information for guidance into a state in which the influence of environment is reduced or increased based on at least one piece of environmental information acquired for each state, and a provision unit that provides the guidance information.

(21) An image display system including one or more external devices that provide environmental information for each state, and a head- or face-mounted image display device that generates and provides guidance information for guidance into a state in which the influence of environment is reduced or increased based on at least one piece of environmental information acquired for itself or acquired from the external device.

What is claimed is:

1. An image display device, comprising:
one or more processors configured to:
acquire, from a set of sensors, a plurality of instances of state information of a body of the image display device, wherein the state information includes at least one of position or posture;
acquire, from another set of sensors, environmental information for each acquired instance of the state information, wherein the acquired environmental information corresponds to one or more environmental factors that have an influence on at least one of the image display device or a user of the image display device;
determine based on acquisition of the environmental information a determined number of times, a direction in which the influence of the one or more environment factors on the at least one of the image display device or the user is one of reduced or increased based on the acquired environmental information and the state information, wherein the influence is increased based on the one or more environmental factors having a good influence, and reduced based on the one or more environmental factors having an adverse influence;
generate guidance information based on the determined direction for guiding the at least one of the image display device or the user into a subsequent state; and
output the generated guidance information to a display configured to display the generated guidance information in a superimposed manner on a real-time visual field of the user.

2. The image display device according to claim 1, wherein the environmental information relates to at least one of the one or more environmental factors that include: electromagnetic waves, heat rays, radiation, carbon monoxide, carbon dioxide, oxygen, nitrogen oxide, nitrogen compounds, hydrocarbons, particulate matter, photochemical smog, pollen, house dust, and negative ions to which the at least one of the image display device or the user is exposed.

3. The image display device according to claim 1, wherein the one or more processors are further configured to generate the guidance information for guidance into the subsequent state in which at least one of the one or more environmental factors that have the adverse influence on the at least one of the image display device or the user is reduced, or the guidance information for guidance into the subsequent state in which at least one of the one or more environmental factors that have the good influence on the at least one of the image display device or the user is increased.

4. The image display device according to claim 1, wherein the one or more processors are further configured to output the guidance information on the display as an image.

5. The image display device according to claim 4, wherein the one or more processors are further configured to output the guidance information on the display in a superimposed manner on an image of the visual field of the user with the image display device mounted on a head or a face of the user.

6. The image display device according to claim 5, wherein the one or more processors are further configured to output, on the display in a superimposed manner on the image of the visual field of the user, the guidance information that indicates the direction in which the influence of environment is reduced or increased.

7. The image display device according to claim 1, wherein the one or more processors are further configured to acquire current state information related to a current position of the image display device and a current posture of the user at a current time,
wherein the one or more processors are further configured to acquire the environmental information related to the at least one of the image display device or the user based on a change in the state information, and
wherein the one or more processors are further configured to generate the guidance information based on the environmental information acquired for a determined time up to the current time.

8. The image display device according to claim 1, wherein the one or more processors are further configured to acquire the state information related to a current position of the image display device and a current posture of the user, and
wherein the one or more processors are further configured to generate the guidance information with respect to the current position or the current posture, based on the environmental information acquired by the one or more processors in a different position or in a different posture.

9. The image display device according to claim 1,
wherein the one or more processors are further configured to acquire state information related to a current position of the image display device, a current posture of the user, and a temperature, and
wherein the one or more processors are further configured to generate the guidance information with respect to the current position or the current posture, based on the environmental information acquired by the one or more processors in a different position or in a different posture or at a different temperature.

10. The image display device according to claim 1,
wherein the one or more processors are further configured to:
acquire current state information related to a current position of the image display device and a current posture of the user within a determined period of time,
acquire the environmental information related to the at least one of the image display device or the user based on change in the state information within the determined period of time, and
generate the guidance information within the determined period of time based on the acquired environmental information.

11. The image display device according to claim 10, wherein the one or more processors are further configured to stop at least a function in the image display device in a period of time other than the determined period of time.

12. The image display device according to claim 10,
wherein the one or more processors are further configured to acquire the state information related to the current position of the image display device and the current posture of the user and a temperature, and
wherein the one or more processors are further configured to generate the guidance information with respect to the current position or the current posture, based on the environmental information acquired by the one or more processors in a different position or in a different posture or at a different temperature within the determined period of time.

13. The image display device according to claim 1, further comprising:
a memory that stores the environmental information acquired by the one or more processors in association with the state information at a time of acquisition,
wherein the one or more processors are further configured to generate guidance information based on the environmental information stored in the memory.

14. The image display device according to claim 1,
wherein the one or more processors are further configured to communicate with an external device that provides the environmental information,
wherein the one or more processors are further configured to acquire the environmental information from the external device, and
wherein the one or more processors are further configured to generate the guidance information based on the acquired environmental information.

15. The image display device according to claim 14,
wherein the external device includes at least one of another image display device or an information terminal other than the image display device that is mounted on another user, an information terminal that is installed in a mobile device, an information terminal that is fixed to a specific location, or a server which is configured to hold environmental information acquired by a plurality of information terminals.

16. The image display device according to claim 1,
wherein the one or more processors are further configured to map a strength distribution for the one or more environmental factors on a two-dimensional plane that includes a route scheduled by the user of the image display device to generate the guidance information.

17. The image display device according to claim 16,
wherein the one or more processors are further configured to communicate with an external device which is configured to provide the environmental information,
wherein the one or more processors are further configured to acquire the environmental information from the external device, and
wherein the one or more processors are further configured to generate the guidance information in which the environmental information at a plurality of points acquired through the one or more processors is mapped in two dimensions.

18. The image display device according to claim 16,
wherein the one or more processors are further configured to subject environmental information of a point where a piece of environmental information is unavailable on the route to an interpolation process.

19. An image display method, comprising:
acquiring, from a set of sensors, a plurality of instances of state information of a body of an image display device, wherein the state information includes at least one of position or posture;
acquiring from another set of sensors, environmental information for each acquired instance of the state information, wherein the acquired environmental information corresponds to one or more environmental factors that have an influence on at least one of the image display device or a user of the image display device;
determining based on acquisition of the environmental information a determined number of times, a direction in which the influence of the one or more environment factors on the at least one of the image display device or the user is one of reduced or increased based on the acquired environmental information and the acquired state information, wherein the influence is increased based on the one or more environmental factors having a good influence, and reduced based on the one or more environmental factors having an adverse influence;
generating guidance information based on the determined direction for guiding the at least one of the image display device or the user into a subsequent state; and
outputting the generated guidance information to a display configured to display the generated guidance information in a superimposed manner on a real-time visual field of the user.

20. A non-transitory computer readable medium having stored thereon, computer-executable instructions for causing an image display device to perform operations, comprising:
acquiring, from a set of sensors, a plurality of instances of state information of a body of an image display device, wherein the state information includes at least one of position or posture;
acquiring from another set of sensors, environmental information for each acquired instance of the state information, wherein the acquired environmental information corresponds to one or more environmental factors that have an influence on at least one of the image display device or a user of the image display device;

determining based on acquisition of the environmental information a determined number of times, a direction in which the influence of the one or more environment factors on the at least one of the image display device or the user is one of reduced or increased based on the acquired environmental information and the acquired state information, wherein the influence is increased based on the one or more environmental factors having a good influence, and reduced based on the one or more environmental factors having an adverse influence;

generating guidance information based on the determined direction for guiding the at least one of the image display device or the user into a subsequent state; and providing the generated guidance information to a display configured to display the generated guidance information in a superimposed manner on a real-time visual field of the user.

21. An image display system, comprising:

one or more external devices that provide environmental information; and a head- or face-mounted image display device configured to:
  acquire from a set of sensors, a plurality of instances of state information of a body of the head- or face-mounted image display device, wherein the state information includes at least one of position or posture;
  acquire, from the one or more external devices, the environmental information for each acquired instance of the state information, wherein the acquired environmental information corresponds to one or more environmental factors that have an influence on at least one of the head- or face-mounted image display device or a user of the head- or face-mounted image display device;
  determine based on acquisition of the environmental information a determined number of times, a direction in which the influence of the one or more environment factors on the at least one of the head- or face-mounted image display device or the user is one of reduced or increased based on the acquired environmental information and the acquired state information, wherein the influence is increased based on the one or more environmental factors having a good influence, and reduced based on the one or more environmental factors having an adverse influence;
  generate guidance information based on the determined direction for guiding the at least one of the head- or face-mounted image display device or the user into a subsequent state; and
output the generated guidance information to a display configured to display the generated guidance information in a superimposed manner on a real-time visual field of the user.

* * * * *